(12) United States Patent
Nilsson et al.

(10) Patent No.: US 12,255,701 B2
(45) Date of Patent: Mar. 18, 2025

(54) METHOD AND APPARATUS FOR RADIO COMMUNICATIONS

(71) Applicant: Telefonaktiebolaget LM Ericsson (publ), Stockholm (SE)

(72) Inventors: Magnus Nilsson, Lund (SE); Peter Jakobsson, Lund (SE); Per Ingelhag, Alingsås (SE); Sten Wallin, Enskede (SE); Joakim Plahn, Täby (SE); Martin Isberg, Lund (SE); Torsten Carlsson, Lund (SE); Peter Svensson, Lund (SE); Agneta Ljungbro, Bjärred (SE); Örjan Renström, Spånga (SE); Dandan Hao, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 19 days.

(21) Appl. No.: 17/798,185

(22) PCT Filed: Feb. 9, 2021

(86) PCT No.: PCT/EP2021/052993
§ 371 (c)(1),
(2) Date: Aug. 8, 2022

(87) PCT Pub. No.: WO2021/160570
PCT Pub. Date: Aug. 19, 2021

(65) Prior Publication Data
US 2023/0073740 A1   Mar. 9, 2023

Related U.S. Application Data

(60) Provisional application No. 62/972,381, filed on Feb. 10, 2020.

(51) Int. Cl.
*H04B 7/024*   (2017.01)
*H04B 7/06*   (2006.01)
(Continued)

(52) U.S. Cl.
CPC ........... *H04B 7/024* (2013.01); *H04B 7/0617* (2013.01); *H04B 7/086* (2013.01); *H04B 7/15* (2013.01)

(58) Field of Classification Search
CPC ...... H04B 7/14; H04B 7/15564; H04B 7/024; H04B 7/0617; H04B 7/086; H04B 7/15; H04B 7/022
See application file for complete search history.

(56) References Cited

U.S. PATENT DOCUMENTS

| 4,812,855 A | 3/1989 | Coe et al. |
| 6,054,960 A | 4/2000 | Tolson et al. |

(Continued)

FOREIGN PATENT DOCUMENTS

| CN | 101449190 A | 6/2009 |
| CN | 102685673 A | 9/2012 |

(Continued)

OTHER PUBLICATIONS

"3rd Generation Partnership Project; Technical Specification Group Radio Access Network; NR; Base Station (BS) radio transmission and reception (Release 17)", 3GPP TS 38.104 V17.0.0, Dec. 2020, 295 pages.

(Continued)

*Primary Examiner* — Berhanu Tadese
(74) *Attorney, Agent, or Firm* — Murphy, Bilak & Homiller, PLLC

(57) ABSTRACT

In an example embodiment, a system comprises a chain of serially coupled nodes, including a central processing node (CPN) and one or more radio communications nodes (RCNs). The CPN couples to a first RCN in the chain via a dielectric waveguide (DWG) link and any further RCNs in the chain are successively connected in serial fashion from the first RCN via further (DWG) links. The CPN generates (Continued)

outbound radio carrier signals that are waveguide-propagated in a downstream direction of the chain, for over-the-air (OTA) by targeted ones of the RCNs, while radio carrier signals received via OTA reception by respective ones of the RCNs are waveguide propagated as inbound radio signals in an upstream direction of the chain, for processing by the CPN. Advantages from he contemplated system include greatly simplified implementation of the RCNs, with lower cost and power consumption. Further, strategic placement of failover CPNs and DWG links provide for continued operation in the face of CPN or DWG link failures.

13 Claims, 9 Drawing Sheets

(51) Int. Cl.
   *H04B 7/08* (2006.01)
   *H04B 7/15* (2006.01)

(56) References Cited

U.S. PATENT DOCUMENTS

| | | | |
|---|---|---|---|
| 6,799,045 B1 * | 9/2004 | Brouwer | H04W 52/343 455/442 |
| 6,975,877 B1 | 12/2005 | Dergun et al. | |
| 7,372,424 B2 * | 5/2008 | Mohuchy | H01Q 21/245 343/700 MS |
| 7,460,468 B2 * | 12/2008 | Taylor | H04L 41/0663 370/216 |
| 8,199,638 B2 * | 6/2012 | Taylor | H04L 12/5601 370/228 |
| 8,203,483 B2 * | 6/2012 | Richards | H01Q 3/2605 342/368 |
| 8,344,949 B2 * | 1/2013 | Moshfeghi | A63F 13/216 342/464 |
| 9,478,843 B2 * | 10/2016 | Tang | H01P 5/188 |
| 9,806,818 B2 * | 10/2017 | Henry | H02J 13/00007 |
| 9,960,849 B1 * | 5/2018 | Dogiamis | H04B 10/2575 |
| 10,027,397 B2 * | 7/2018 | Kim | H04B 7/04 |
| 10,051,587 B2 | 8/2018 | Jayaraman et al. | |
| 10,079,668 B2 | 9/2018 | Dogiamis et al. | |
| 10,231,130 B2 | 3/2019 | Sunay et al. | |
| 10,804,940 B2 * | 10/2020 | Artemenko | H04B 1/006 |
| 11,349,530 B2 | 5/2022 | Frenger et al. | |
| 11,916,625 B2 | 2/2024 | Frenger et al. | |
| 2001/0045915 A1 | 11/2001 | Moren | |
| 2006/0017607 A1 | 1/2006 | Hayata et al. | |
| 2006/0209670 A1 * | 9/2006 | Gorokhov | H04L 27/261 370/208 |
| 2007/0081557 A1 * | 4/2007 | Binetti | H04L 69/14 370/477 |
| 2007/0188398 A1 * | 8/2007 | Mohuchy | H01Q 9/285 343/700 MS |
| 2007/0269170 A1 | 11/2007 | Easton et al. | |
| 2008/0125109 A1 | 5/2008 | Larsson et al. | |
| 2008/0204330 A1 | 8/2008 | Hsiao et al. | |
| 2008/0318614 A1 * | 12/2008 | Iizuka | H04W 52/42 455/522 |
| 2009/0122782 A1 * | 5/2009 | Horn | H04W 56/001 370/350 |
| 2009/0147768 A1 * | 6/2009 | Ji | H04J 3/06 370/350 |
| 2009/0316630 A1 * | 12/2009 | Yamada | H04W 56/0005 370/328 |
| 2010/0067515 A1 * | 3/2010 | Chin | H04W 56/002 370/350 |
| 2010/0067588 A1 * | 3/2010 | Takano | H04J 99/00 455/69 |
| 2010/0238917 A1 * | 9/2010 | Silverman | H04J 3/0667 375/354 |
| 2011/0200325 A1 | 8/2011 | Kobyakov et al. | |
| 2011/0216660 A1 * | 9/2011 | Lee | H04J 3/06 370/252 |
| 2011/0280287 A1 | 11/2011 | Cheng et al. | |
| 2012/0027361 A1 * | 2/2012 | Brower | G02B 6/44715 385/89 |
| 2012/0120874 A1 * | 5/2012 | McLaughlin | H04W 56/002 370/328 |
| 2012/0315938 A1 * | 12/2012 | Van Nee | H04B 7/0615 455/507 |
| 2013/0272696 A1 | 10/2013 | Webb et al. | |
| 2013/0285879 A1 | 10/2013 | Wheeler | |
| 2014/0029689 A1 * | 1/2014 | Liu | H04B 7/0486 375/267 |
| 2014/0037294 A1 | 2/2014 | Cox et al. | |
| 2014/0132477 A1 | 5/2014 | Chan et al. | |
| 2014/0211779 A1 | 7/2014 | Caire et al. | |
| 2014/0362840 A1 | 12/2014 | Wong et al. | |
| 2015/0003261 A1 | 1/2015 | Silverman et al. | |
| 2015/0162751 A1 | 6/2015 | Leabman et al. | |
| 2015/0372744 A1 * | 12/2015 | Lehtinen | H04B 7/0671 370/329 |
| 2016/0112263 A1 * | 4/2016 | Henry | G01R 31/58 370/250 |
| 2016/0277160 A1 * | 9/2016 | Lim | H04W 52/46 |
| 2016/0323925 A1 * | 11/2016 | Alanen | H04W 8/005 |
| 2016/0360533 A1 * | 12/2016 | Bennett | H04Q 11/0421 |
| 2017/0195109 A1 * | 7/2017 | Perez-Cruz | G01S 5/0081 |
| 2017/0195140 A1 * | 7/2017 | Yi | H04L 5/0023 |
| 2017/0264011 A1 * | 9/2017 | Kim | H01Q 13/0275 |
| 2017/0271745 A1 | 9/2017 | Yun et al. | |
| 2017/0279515 A1 * | 9/2017 | Wu | H04B 7/0456 |
| 2017/0295550 A1 * | 10/2017 | Amizur | H04W 56/001 |
| 2018/0041980 A1 * | 2/2018 | Virginas | H04W 56/0065 |
| 2018/0109392 A1 * | 4/2018 | Gerszberg | H04B 1/38 |
| 2018/0152226 A1 | 5/2018 | Li et al. | |
| 2019/0229821 A1 * | 7/2019 | Liu | H04L 1/0029 |
| 2019/0260459 A1 * | 8/2019 | Jeon | H04B 7/088 |
| 2019/0261202 A1 * | 8/2019 | Tang | H04B 7/088 |
| 2019/0361180 A1 * | 11/2019 | Lam | G02B 6/4251 |
| 2019/0363763 A1 * | 11/2019 | Frenger | H04B 7/0469 |
| 2020/0187020 A1 * | 6/2020 | Asano | H04B 5/00 |
| 2023/0073740 A1 * | 3/2023 | Nilsson | H04B 7/022 |

FOREIGN PATENT DOCUMENTS

| | | | | |
|---|---|---|---|---|
| CN | 102754365 A | | 10/2012 | |
| CN | 103222108 A | * | 7/2013 | ............ H01Q 1/007 |
| CN | 103222108 B | * | 5/2015 | ............ H01Q 1/007 |
| CN | 108418614 A | | 8/2018 | |
| EP | 0667068 A1 | | 8/1995 | |
| EP | 0830754 A1 | | 3/1998 | |
| EP | 2214261 A1 | * | 8/2010 | ........... H01Q 1/1292 |
| EP | 2169769 B1 | | 1/2011 | |
| EP | 2515374 A2 | | 10/2012 | |
| EP | 2629363 A1 | | 8/2013 | |
| EP | 2999155 A1 | | 3/2016 | |
| GB | 1321582 A | | 6/1973 | |
| JP | 2004503991 A | | 2/2004 | |
| JP | 2008182733 A | * | 8/2008 | ............ H01Q 1/286 |
| JP | 2009527145 A | | 7/2009 | |
| JP | 2009537964 A | | 10/2009 | |
| JP | 2014017678 A | | 1/2014 | |
| KR | 20190098693 A | | 8/2019 | |
| WO | WO-9506365 A1 | * | 3/1995 | ............ H01Q 21/29 |
| WO | WO-9641430 A1 | * | 12/1996 | ............ H01Q 21/29 |
| WO | 0007307 A2 | | 2/2000 | |
| WO | 0197465 A1 | | 12/2001 | |
| WO | 2007142805 A2 | | 12/2007 | |
| WO | WO-2010086173 A1 | * | 8/2010 | ........... H01Q 1/1292 |
| WO | WO-2012072102 A1 | * | 6/2012 | ............ H01Q 1/007 |
| WO | WO-2016039842 A1 | * | 3/2016 | ............ B23K 9/095 |
| WO | 2016115546 A1 | | 7/2016 | |
| WO | WO-2018103897 A1 | * | 6/2018 | ............ H01Q 1/246 |
| WO | WO-2018106452 A1 | * | 6/2018 | ............... H04B 7/04 |
| WO | 2019101290 A1 | | 5/2019 | |
| WO | WO-2019152793 A1 | * | 8/2019 | ........... H04B 1/0475 |

(56) References Cited

FOREIGN PATENT DOCUMENTS

| WO | 2018103897 A9 | 10/2019 | | |
| WO | WO-2019240808 A1 | * | 12/2019 | |
| WO | WO-2021160570 A1 | * | 8/2021 | ............ H04B 7/022 |

OTHER PUBLICATIONS

"3rd Generation Partnership Project; Technical Specification Group Radio Access Network; NR; Study on Integrated Access and Backhaul; (Release 16)", 3GPP TR 38.874 V.16.0.0, Dec. 2018, 111 pages.
Dahlman, Erik , et al., "5G NR The Next Generation Wireless Access Technology", Academic Press, Elsevier Ltd., 2018, 469 pages.
Interdonato, Giovanni , "Signal Processing Aspects of Cell-Free Massive MIMO", Linköping Studies in Science and Technology Licentiate Thesis No. 1817, 2018, 1-49.
Interdonato, Giovanni , et al., "Ubiquitous Cell-Free Massive MIMO Communications", arXiv:1804.03421v4 [cs.IT], Sep. 6, 2019, 13 pages.
Narevsky, Nathan , et al., "eWallpaper Burst-Mode Serial Link", BWRC Summer Retreat, May 18-20, 2014, 1-1.
Preuss, Robert D., et al., "Two-Way Synchronization for Coordinated Multicell Retrodirective Downlink Beamforming", IEEE Transactions on Signal Processing, vol. 59, No. 11, Nov. 2011, 1-13.
Puglielli, Antonio , et al., "Design of Energy- and Cost-Efficient Massive MIMO Arrays", Proceedings of the IEEE, vol. 104, No. 3, Mar. 2016, 1-21.
Zhang, Yuxian , et al., "Measurement and Evaluations of Coherent Joint Transmission for 5G Networks", 2017 IEEE Vehicular Technology Conference (VTC Spring), Jun. 4, 2017, 1-5.

* cited by examiner

METHOD AND APPARATUS FOR RADIO COMMUNICATIONS

TECHNICAL FIELD

The present invention relates to radio communications and the use of radio communication nodes, such as antenna processing units (APUs) in serial interconnection with a supporting central processing unit (CPU).

BACKGROUND

The Fifth Generation (5G) of mobile communication systems promulgated by the Third Generation Partnership Project (3GPP) are designed to provide high quality of service (QoS). High QoS requires reliable radio connections between User Equipments (UEs) and the network base stations serving them. Consider, for example, the increasing deployment of wirelessly-connected machine devices, some operating in safety-critical roles and requiring real-time communication with low latency and high reliability.

The phrase "cell-free massive Multiple-Input-Multiple-Output (MIMO)" refers to a massive MIMO system where the base-station antennas, sometimes referred to as access points (APUs), are geographically spread out. Each UE within the associated coverage area(s) is surrounded by serving APUs and experiences no cell boundaries. The APUs are connected, through a fronthaul network, to a central processing unit (CPU) which is responsible for processing the data from each APU. Such architectures hold promise for implementing ultra-reliable networks, because, as a general proposition, any given UE is reachable by more than one APU.

Other areas of interest in network development include the use of higher radio frequencies. 5G specifications introduce new frequency bands in millimeter wave (mmW) range. See, e.g., "FR2" in the 3GPP Technical Specification (TS) 38.104, referring to radio spectrum at 24.25-52.6 GHz. Even higher frequency bands are envisioned for 6G, up to several hundred GHz. These high frequencies present challenges in radio propagation and cell-free massive MIMO architectures may complement the use of these higher frequencies for the involved radio carrier signals, because the multiplicity of distributed APUs makes it more likely that given UEs will be relatively close to one or more APUs. The architecture also addresses the problems of wall penetration in indoor deployment scenarios but brings with it a host of design and implementation challenges.

SUMMARY

In an example embodiment, a radio communication system comprises a chain of serially coupled nodes, including a central processing node (CPN) and one or more radio communications nodes (RCNs). The CPN couples to a first RCN in the chain via a dielectric waveguide (DWG) link and any further RCNs in the chain are successively connected in serial fashion from the first RCN via further (DWG) links. The CPN generates outbound radio carrier signals that are waveguide-propagated in a downstream direction of the chain, for over-the-air (OTA) by targeted ones of the RCNs, while radio carrier signals received via OTA reception by respective ones of the RCNs are waveguide propagated as inbound radio signals in an upstream direction of the chain, for processing by the CPN. Advantages from the contemplated system include greatly simplified implementation of the RCNs, with lower cost and power consumption. Further, strategic placement of failover CPNs and DWG links in one or more embodiments of the system provide for continued operation in the face of CPN or DWG link failures.

In at least one embodiment, a radio communications system includes a CPN and two or more RCNs serially connected as chain, with each serial link in the chain comprising a DWG link, and each serial link having a downstream direction away from the CPN and an upstream direction towards the CPN. The CPN is configured to control individual ones of the RCNs to operate as base stations or relay station.

Any given RCN in the chain operating as a base station either (a) receives an outbound radio carrier signal generated by the CPN and propagated via the chain in the downstream direction, and transmits the outbound radio carrier signal OTA, as a downlink radio carrier signal for reception by one or more UEs served by the base station; or (b) receives a radio carrier signal OTA, as an uplink radio carrier signal originating from one of the UEs served by the base station and propagates the received radio carrier signal via the chain in the upstream direction, for processing by the CPN.

Any given RCN operating in the chain as a relay station either (a) receives inbound radio carrier signals propagating in the chain in the upstream direction and propagates them to the next upstream hop in the chain—i.e., the next DWG link towards the CPN—or (b) receives outbound radio signals propagating in the chain in the downstream direction and propagates them to the next downstream hop in the chain—i.e., the next DWG link away from the CPN. Consider another example arrangement where a radio communication system includes respective first and second chains of RCNs that are serially interconnected to a first CPN via associated DWG links, respective third and fourth chains of RCNs that are serially interconnected to a second CPN via associated DWG links, and respective fifth and sixth chains of RCNs that are serially interconnected to a third CPN via associated DWG links. Further, the system includes failover elements, including a first failover DWG link coupling a terminal end of the second chain to a terminal end of the third chain, a second failover DWG link coupling a terminal end of the fourth chain to a terminal end of the fifth chain, a first failover CPN coupled to a terminal end of the first chain, and a second failover CPN coupled to a terminal end of the sixth chain. Correspondingly, a supervisory apparatus is configured to selectively activate the first and second failover CPNs and the first and second failover dielectric links, to allow the first CPN or the first failover CPN to serve RCNs beyond the first failover DWG link and to allow the third CPN or the second failover CPN to serve RCNs beyond the second failover DWG link.

In another example, an RCN includes a dielectric waveguide (DWG) interface operative for interconnection of the RCN in a chain of RCNs that are interconnected via DWG links, with the chain anchored by a CPN. The RCN includes an upstream interface for coupling to an upstream dielectric waveguide link and includes a downstream interface for coupling to a downstream dielectric waveguide. In relay operation, the RCN couples radio carrier signals incoming on its upstream interface into its downstream interface, for waveguide conveyance to a next RCN in the downstream direction of the chain, and couples radio carrier signals incoming on its downstream interface into its upstream interface, for waveguide conveyance in the upstream direction to the CPN or a next RCN. In base-station or "transceiver" operation, the RCN couples radio carrier signals received via over-the-air (OTA) reception into the upstream interface and couples radio carrier signals received via the upstream interface into its antenna circuitry, for OTA transmission.

In more detail, an RCN in one or more embodiments includes antenna circuitry and a DWG interface. The antenna circuitry is configured for OTA transmission of radio carrier signals via an antenna array and over-the-air reception of radio carrier signals via the antenna array. Correspondingly, the DWG interface is coupled to the antenna circuitry and configured for a series interconnection of the RCN via DWG links. To that end, the DWG interface includes a first coupling circuit for transmitting radio carrier signals into a first DWG and receiving radio carrier signals from the first dielectric waveguide, and further includes a second coupling circuit for transmitting radio carrier signals into a second DWG and receiving radio carrier signals from the second dielectric waveguide.

Control circuitry of the RCN configures the RCN for relay operation or base-station operation. In base-station operation, radio carrier signals received by the antenna circuitry via OTA reception are coupled into the DWG interface and transmitted into at least one of the first and second DWGs, and radio carrier signals received by DWG interface are coupled into the antenna circuitry for over-the-air transmission. In relay operation, radio carrier signals received from the DWG via the first coupling circuit are coupled to the second coupling circuit (94) and transmitted into the second DWG, and radio carrier signals received from the second DWG via second coupling circuit are coupled to the first coupling circuit and transmitted into the first DWG.

Yet another example involves a method of operating an RCN that is positioned as one in a serial linking of RCNs, with the serial linking comprising interconnecting DWGs, referred to as serial links or hops and serially interconnecting the RCNs to a CPN. The CPN anchors the serial linking and sends outbound radio carrier signals via the serial linking, for over-the-air transmission by specific ones of the RCNs and receives inbound radio carrier signals via the serial linking, for processing by the CPN.

With reference to the CPN and RCN arrangement described immediately above, one embodiment of the method includes an RCN receiving an outbound radio carrier signal going in an outbound direction along the serial linking and performing an OTA transmission of the outbound radio carrier signal, in a case where the outbound radio carrier signal targets a UE served by the RCN, or propagating the outbound radio carrier signal along a next outbound hop of the serial linking, in a case where the outbound radio carrier signal does not target a UE served by the RCN. Of course, there may be certain radio carrier signals that are both propagated in the serial linking and OTA-transmitted by the RCN, such as outbound radio carrier signals that are intended for broadcasting by some or all of the RCNs in the chain.

The method further includes the RNC receiving an inbound radio carrier signal going in an inbound direction along the serial linking and propagating the inbound radio carrier signal along a next inbound hop of the serial linking, and receiving a radio carrier signal as an over-the-air transmission from a UE served by the radio communications node and propagating the received radio carrier signal along the next inbound hop of the serial linking as an inbound radio carrier signal. Of course, such operations may be performed at different times and the method may include operating in a Time Division Duplexing (TDD) manner, such that OTA reception and transmission by the RCN are mutually exclusive and/or such that the RCN propagating inbound radio carrier signals is mutually exclusive from propagating outbound radio carrier signals, at least with respect to the same DWG.

The RCNs are also referred to as "antenna processing units" or APUs to denote their simplified structure and to emphasize that, while the APUs may provide transmit and/or receive beamforming, the CPN provides processing for all the radio carrier signals handled by an APU. For example, the CPN provides modulation and frequency up-conversion to generate outbound radio carrier signals and provides frequency down-conversion and demodulation for inbound radio carrier signals. As such, a CPN, also referred to as a central processing unit or CPU, may be referred to as a distributed base station (BS).

An example distributed BS comprises a chain that includes a CPU and one or more APUs, with the CPU connected to a first one of the APUs via a first DWG link. To the extent that the chain includes a second APU, a second DWG link interconnects the first APU with the second APU, and any further APUs are serially connected using respective further DWG links. Each DWG link includes at least one DWG, which may be referred to as a "stripe." Of course, each DWG link may comprise two or more DGWs in parallel, e.g., for added capacity and/or for carrying different polarizations of radio carrier signals.

In an example implementation that retains waveguide dimensions that are practicable, the DWGs accommodate high operating frequencies, e.g., 90 GHz and upwards, and exhibit reasonable insertion loss. And, as an overall characteristic of the contemplated radio communication system and its constituent elements, e.g., its included CPU and APUs, the radio carrier signals that are OTA-transmitted or OTA-received by APUs in the chain and the corresponding outbound and inbound radio carrier signals that are DWG-propagated in the chain have the same operating frequency and modulation. That is, as noted before, the CPU provides for radio-carrier-signal processing, such as frequency up-conversion and modulation for outbound radio carrier signals input into the chain for DWG propagation to the RCN(s) targeted for OTA transmission of those outbound radio carrier signals.

The APUs can be in either standby, repeater mode, or transceiver mode, with the latter mode also referred to as base-station mode. Under at least some circumstances or in at least some arrangements, only one of the series connected APUs is in transceiver mode at a time. As a notable exception, all APUs may simultaneously transmit broadcast channel signals.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
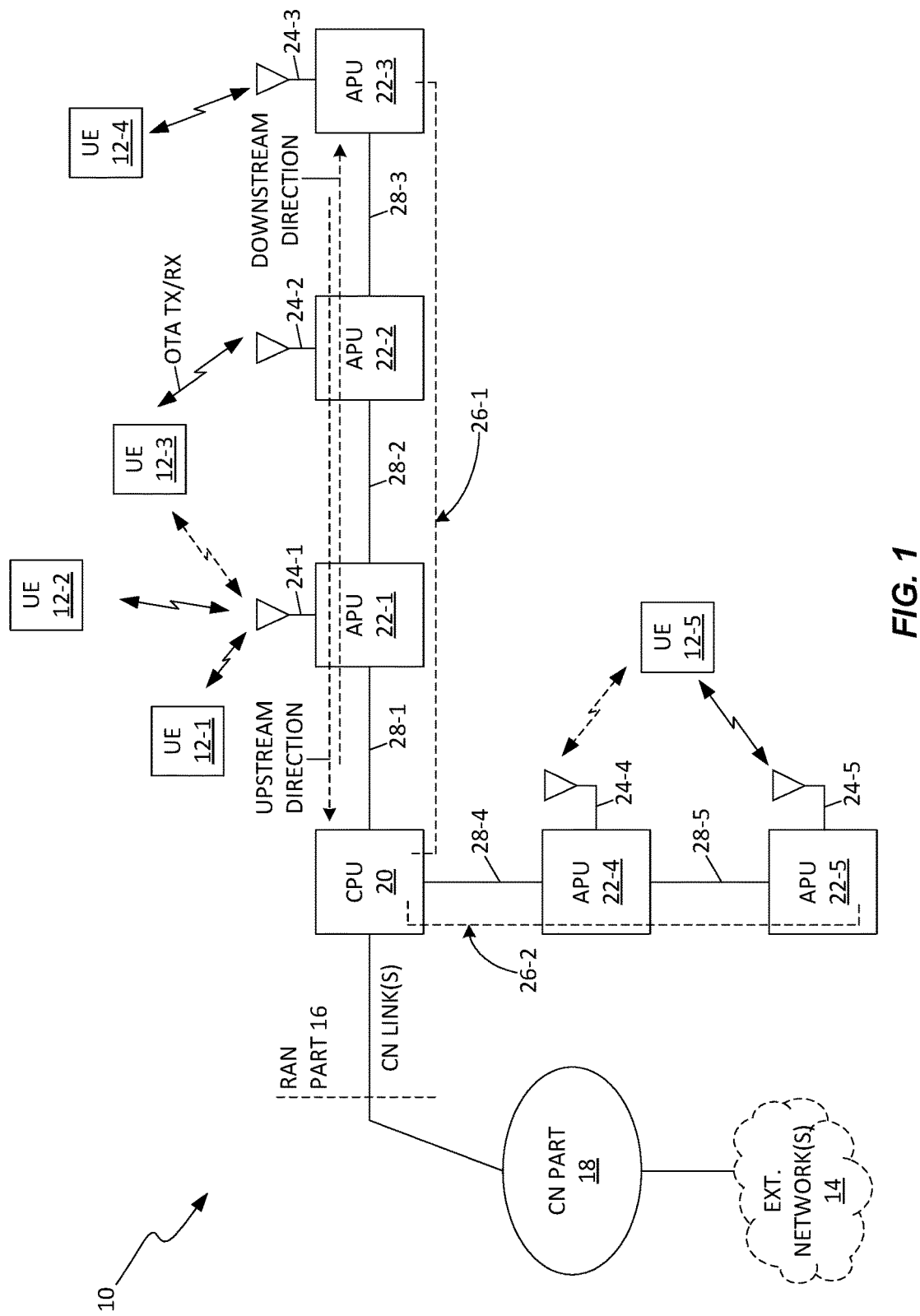
FIG. 1 is a block diagram of one embodiment of a wireless communication network.

FIG. 1 is a block diagram of one embodiment of a wireless communication network 10 ("network 10") that is configured to provide one or more types of communications services to User Equipments (UEs) 12. For example, the network 10 operates as an access network, providing access to one or more external networks (14), such as the Internet.

While FIG. 1 depicts five UEs 12-1 through 12-5, no limitation attends the depiction, as the number of UEs 12 connected to the network 10 varies over time. As with the UEs 12, FIG. 1 and other ones of the accompanying figures may depict elements that are the same or at least broadly similar for purposes of discussion using suffixed reference numbers. However, this specification refers to suffixes only when necessary for clarity. Thus, the reference number "12" without suffixing may be used to refer to a given UE in singular form, or to given UEs in plural form. The same holds for other drawing reference numbers depicted with suffixing in any of the figures.

The term "UE" encompasses essentially any type of wireless communication apparatus that is configured to make use of the network 10—i.e., to communicate via wireless attachment to the network 10. Example types or categories of UEs include smartphones, feature phones, laptops, tablets, or other personal computing devices. Other examples include Machine Type Communication (MTC) devices or Internet-of-Things (IoT) devices, such as sensors and controllers. The UEs 12 served by the network 10 may be of the same type or a mix of various types and the mix may change with time. One or more UEs 12 served by the network 10 may be embedded, e.g., in a vehicle, and one or more may be stationary. For example, the network 10 may be an indoor deployment targeting UEs 12 within a building or may be outdoors in an urban area with foot traffic and vehicle traffic.

The network 10 in an example embodiment is configured according to Third Generation Partnership Project (3GPP) specifications. In at least one embodiment, the network 10 is a Fifth Generation (5G) New Radio (NR) network, according to the corresponding 3GPP specifications. See the specifications referred to as 3GPP Release 15 and newer. However, the architecture of the network 10 has wider applicability than 5G NR deployments and 5G NR stands only as one example.

Different "parts" of the network 10 include a Radio Access Network (RAN) part 16, also referred to as the RAN 16, and a Core Network (CN) part 18, also referred to as the CN 18. While not necessarily germane to radio operations of interest herein, the CN 18 provides authentication, mobility-management, and external-network interfacing functions, in support of providing communication services to the UEs 12, while the RAN 16 provides the air interface(s) by which the UEs 12 are "connected" to the network 10.

Example details for the RAN 16 includes a central processing unit (CPU) 20 and one or more antenna processing units (APUs) 22, e.g., APUs 22-1 through 22-5. A characteristic arrangement contemplated herein is that a CPU 20 and one or more APUs 22 form a "chain" 26 of serially interconnected or interlinked entities. In FIG. 1, the CPU 20 anchors two distinct chains, a first chain 26-1 that includes the APUs 22-1, 22-2, and 22-3 in series, and a second chain 26-2 that includes the APUs 22-4 and 22-5 in series.

The entities constituting each chain 26 are interconnected via dielectric waveguide (DWG) links 28. For example, for the chain 26-1, the CPU 20 couples to the APU 22-1 via a first DWG link 28-1, the APU 22-1 couples to the APU 22-2 via a second DWG link 28-2, and the APU 22-2 couples to the APU 22-3 via a third DWG link 28-3. For the chain 26-2, the CPU 20 couples to the APU 22-4 via a first DWG link 28-4, and the APU 22-4 couples to the APU 22-5 via a second DWG link 28-5.

Each chain 26 has a directional sense, with the direction going away from the CPU 20 being referred to as the "downstream" direction, and with the direction going towards the CPU 20 being referred to as the "upstream" direction. Using this nomenclature, the CPU 20 generates "outbound" radio carrier signals and propagates them into the chain 26 in the downstream direction, for over-the-air (OTA) transmission by one or more of the APUs 22 in the chain 26. Conversely, radio carrier signals received via OTA reception by given ones of the APUs 22 are propagated in the chain 26 in the upstream direction, for conveyance to the CPU 20 for processing—e.g., down-conversion and demodulation.

Saying that a radio carrier signal is "propagated" in the chain 26 refers to DWG-conveyance of the radio carrier signal over one or more successive "hops" or "links" in the chain 26. Each DWG link 28 in the chain constitutes one serial hop or link. Radio carrier signals propagated in the chain 26 may also be referred to as "guided" radio carrier signals or "distributed" radio carrier signals to emphasize that they are conveyed via DWGs. With this in mind, one way to understand operation of the chain 26 is that the CPU 20 generates outbound radio carrier signals, which are then propagated downstream in the chain 26, as far as needed, for OTA transmission by one or more of the APUs 22 in the chain 26. In the opposite direction, radio carrier signals received by given APUs 22 via OTA reception are propagated upstream in the chain 26 to the CPU 20.

Consider an example case where the APU 22-1 in the chain 26-1 operates as a serving base station for the UE 12-1 and the CPU 20 generates a radio carrier signal conveying user traffic for the UE 12-1. The CPU 20 has a DWG interface that couples it to one end of the DWG link 28-1 and it uses that interface to propagate the generated radio carrier signal into the DWG link 28-1 as an outbound radio carrier signal targeting the UE 12-1. In turn, the APU 22-1 includes an "upstream" DWG interface that couples it to the other end of the DWG link 28-1, and it receives the outbound radio carrier signal via its upstream DWG interface. Because the outbound radio carrier signal targets a UE 12 that is served by the APU 22-1, the APU 22-1 performs an OTA transmission of the radio outbound carrier signal.

Consider a similar example, but where the outbound radio carrier signal targets the UE 12-4, which is served by the APU 22-3. In this case, the APU 22-1 propagates the outbound radio carrier signal to the next hop in the chain 26-1, which is the DWG link 28-2 that couples the APU 22-1 to the APU 22-2. In turn, the APU 22-2 propagates the outbound radio carrier signal to the next hop in the chain 26-1, which is the DWG link 28-3 that couples the APU 22-2 to the APU 22-3.

Now consider the inbound case, where and given APU 22 within a chain 26 receives an OTA transmission from a UE 12 that it serves. That is, the given APU 22 receives an uplink radio carrier signal from the UE 12. The given APU 22 couples the received uplink radio carrier signal into the DWG link 28 on its upstream side—facing the CPU 20—for propagation in the chain 26 in the upstream direction as an inbound radio carrier signal for the CPU 20. Any intervening APUs 22 in the upstream direction between the given APU 22 and the CPU 20 perform respective next-hop propagations of the inbound radio carrier signal towards the CPU 20.

As such, each APU 22 can transmit and receive via its DWG interfaces, for propagation of radio carrier signals within the chain 26—i.e., waveguide conveyance in the downstream or upstream direction of the chain 26. Further, each APU 22 includes or is associated with an antenna array 24, for OTA transmission of radio carrier signals, referred to as downlink (DL) transmission, and OTA reception of radio carrier signals, referred to as uplink (UL) reception. All APU operations may be managed and controlled by the CPU 20, e.g. by the CPU 20 distributing control signaling in the chain 26 for the included APUs 22. In one or more embodiments, each APU 22 operates in TDD fashion, such that it performs OTA reception mutually exclusive from OTA transmission and, with respect to one DWG to which it is coupled, it performs DWG reception mutually exclusive from DWG transmission.

Each DWG link 28 comprises at least one DWG—that is, the term "DWG link" as used herein refers to at least one dielectric waveguide. In at least one embodiment, each DWG link 28 comprises a parallel pair of DWGs, with each DWG in the parallel pair being dedicated to a different radio-carrier-signal polarization. Relating this example arrangement to FIG. 1, the DWG link 28-1 is an upstream link with respect to the APU 22-1 and it includes a parallel pair of DWGs, and the DWG link 28-2 is a downstream link with respect to the APU 22-1 and it includes a parallel pair of DWGs. Of course, with respect to the APU 22-2, the DWG link 28-2 is an upstream link and the DWG link 28-3 is a downstream link for the APU 22-2. Using two or more parallel DWGs in each DWG link 28 allows separate radio carrier signals to propagate simultaneously over the DWG link 28, e.g., for different polarizations and/or greater signal capacity in the chain 26. For example, in FIG. 1, consider the case where each DWG link 28 in the chain 26-1 includes a single DWG for each polarization that is in use. That means that one series set of DWGs is available in the entire chain 26-1 for use in transmitting or receiving radio carrier signals of the involved polarization, at least in a TDD implementation.

In at least one arrangement, the DWG links 28 within a chain 26 comprise 2×N parallel DWGs, where the APUs 22 in the chain 26 are interleaved and every N:th APU 22 is connected to the same DWG pair. Also, such arrangements would gain a capacity increase and increased robustness by terminating the chain 26 with a CPU 20 at each end. For example, one of the terminating CPUs 20 could take over for the other one, if needed, using the same set of series-connected DWGs, or the DWG links 28 in the chain 26 could have respective sets of series-connected DWGs for each of the CPUs 20, such that one of the CPUs 20 acts as a master CPU on one of the sets of series-connected DWGs while the other CPU 20 acts as a master CPU on the other one of the sets of series-connected DWGs. Of course, the APUs 22 would be configured to support such operation.

With TDD operation of the CPU 20, APUs 22, and DGW links 28 in one chain 26-1, conveying radio carrier signals in the downlink direction of the chain 26-1 is mutually exclusive from conveying them in the upstream direction. As such, all of the UEs 12 served by the chain 26-1 "share" the radio-carrier-signal bandwidth in time, with only one UE 12 being served at a time. To change this, the chain 26-1 can include more than one DWG in each DWG link 28, for each polarization in use, such that a first series set of DWGs in the chain 26-1 can be used to serve a given UE 12 at a given time instant, while a second series set of DWGs in the chain 26-1 in parallel with the first set can be used to serve another given UE 12 at the same time.

However, whether each of the DWG links 28 that form the series sets of DWGs individually comprise single DWGs or two or more DWGs in parallel, the DWG-based connection arrangement offers distinct advantages. For example, using digital interfaces for the serial interconnections in the chain 26 would raise serious issues with respect to power consumption and complexity of the serial interconnections and the APUs 22, particularly when targeting very high bit rates for the traffic exchanged with the UEs 12 served by the network 10. At a minimum, the use of digital interfaces would require each APU 22 to include corresponding analog-to-digital converters and digital to analog converters. Further, as noted, the APUs 22 as contemplated herein do not perform any modulation, demodulation, or frequency-shifting, meaning that the radio carrier signals they transmit OTA are the same ones they received from the CPU 20 via downstream propagation in the chain 26, subject, of course, to any transmit beamforming applied by the APU 22. Similarly, and APU 22 may perform reception beamforming but, besides that, the OTA-received radio carrier signal incoming to the APU 22 is the same carrier radio signal that the APU 22 propagates in the upstream direction as an inbound radio signal for the CPU 20.

As a further advantageous simplification used in one or more embodiments of the APUs 22, the DWG interfaces included in the APUs 22 operate in TDD fashion with respect to each DWG included in a corresponding DWG link 28-1. That is, with respect to a single DWG, the DWG interface transmits and receives on a mutually exclusive basis. This arrangement reduces complexity, e.g., the need for diplexers and other frequency-multiplexing circuitry. And, as noted, the APUs 22 do not perform frequency-conversion or shifting for the radio carrier signals they handle.

Figure 2:
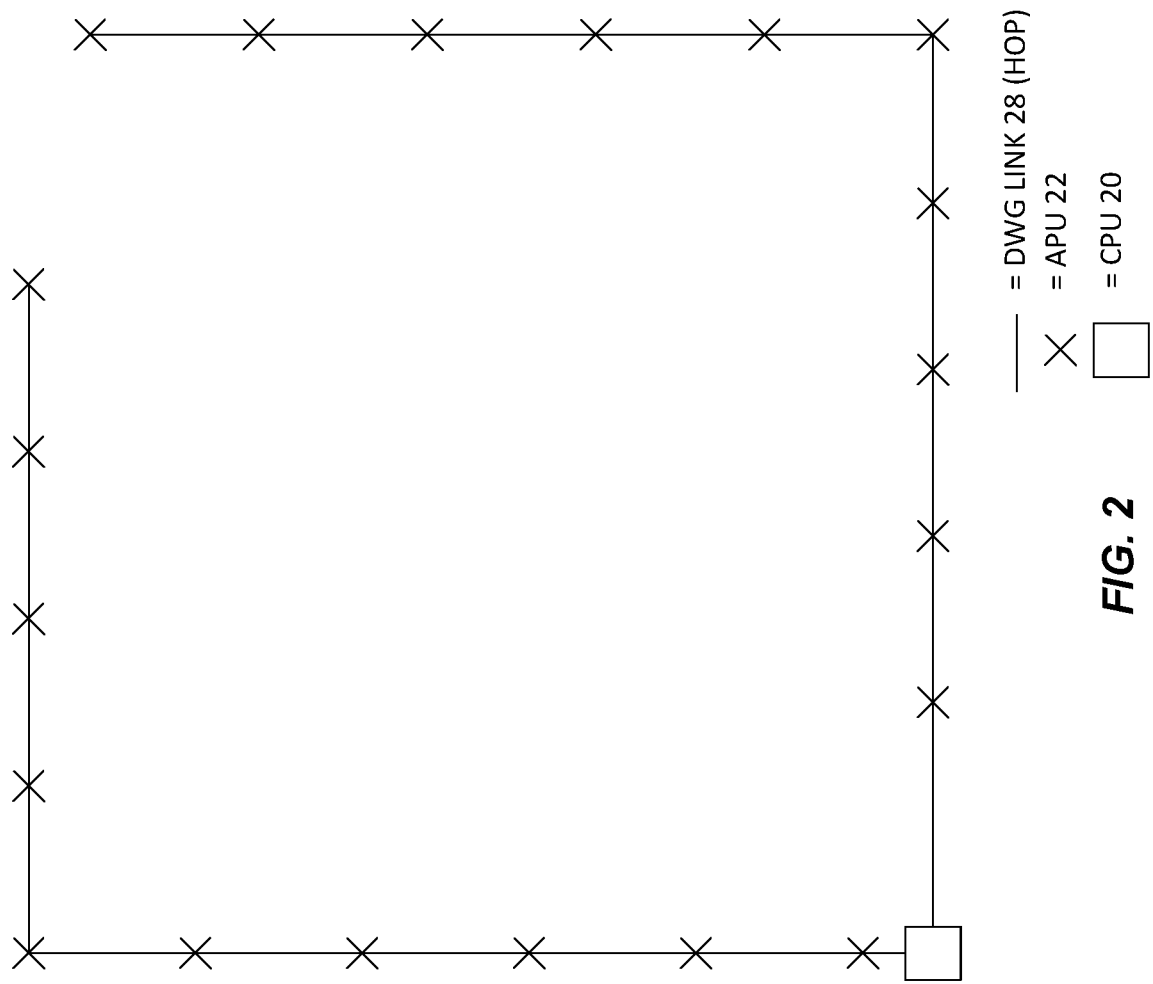
FIG. 2 is a block diagram of an example arrangement of serial chains anchored by a central processing unit, with each chain including a series set of radio communications nodes controlled by the central processing unit, and with dielectric waveguides (DWGs) providing the serial interconnections.

FIG. 2 shows an example system is contemplated herein. Here a CPU 20 is connected to two chains of serial inter-linked APUs 22. Each chain or serial linking consists of several series connected APUs 22. DWGs to carry the radio carrier signals between the APUs 22. For high-frequency radio carrier signals, the DWGs used to implement the DWG links 28 need only have a few square millimeters of cross-sectional area and are inexpensive and flexible and have manageable losses, e.g., less than three dB per meter. And, as will be detailed later, the DWG interfaces used by the CPU 20 and the APUs 22 may radiate their output radio carrier signals contactlessly into the respective DWGs.

In each of the series-connected APUs 22, radio carrier signals incoming to the APU 22 via its DWG interface the signal our amplified to restore the signal level. Amplification adds noise and distortion and, correspondingly, the maximum practical length of a chain 26 is a function of losses in the DWG links 28 and the APU noise figures and distortion. Target modulation and system bandwidth will also limit the maximum length.

Figure 3:
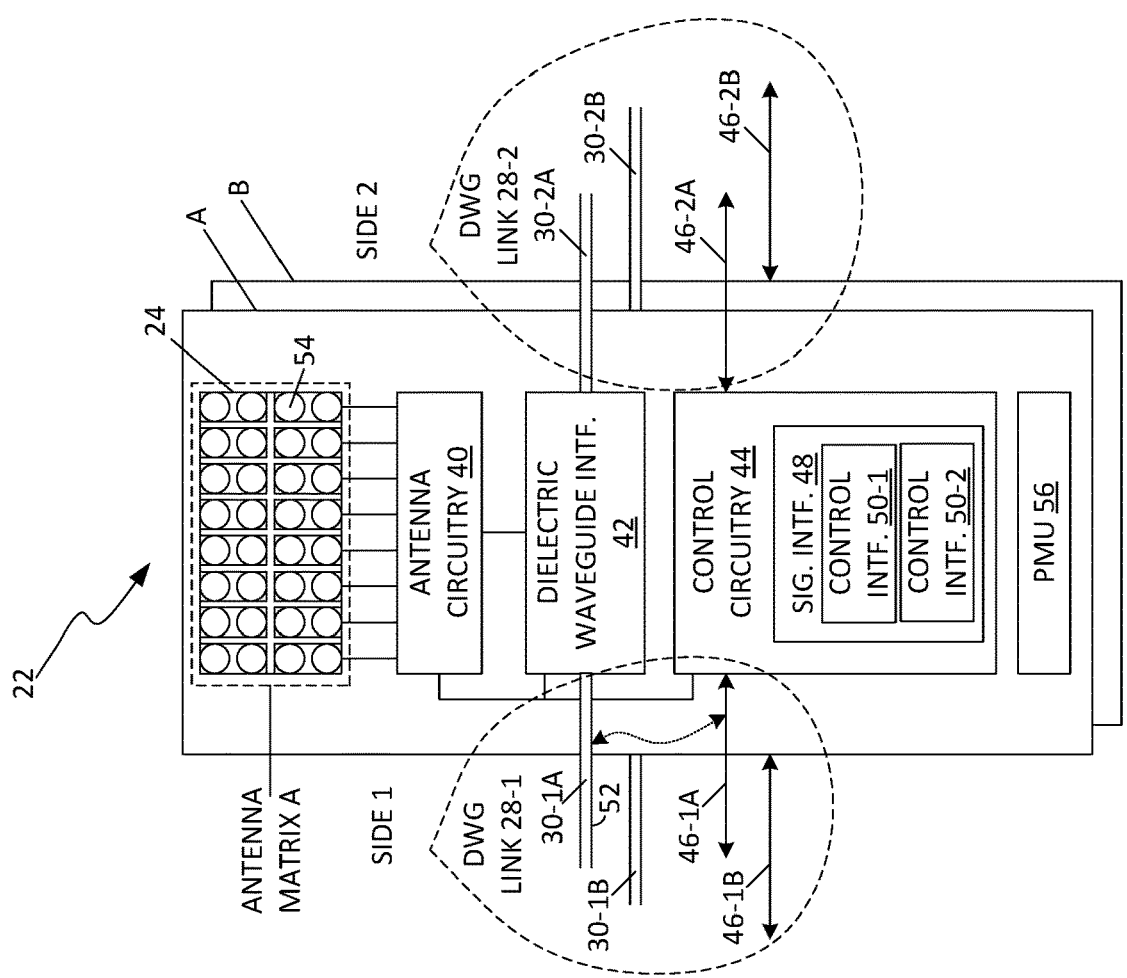
FIG. 3 is a block diagram of one embodiment of a radio communications node for use in a chain.

FIG. 3 depicts an APU 22 in an example embodiment. The APU 22 includes two sides in a functional sense, labeled in the diagram as SIDE 1 and SIDE 2. One is the upstream side facing towards the CPU 20 controlling the chain 26 in which the APU 22 operates and the other side is the downstream side facing away from the CPU 20.

The APU 22 includes "A" elements for a first radio-carrier-signal polarization and "B" elements for a second radio-carrier-signal polarization—e.g., horizontal and vertical polarizations. Correspondingly, the antenna array 24 comprises a small antenna matrix for each polarization. Only the A matrix is visible in the diagram. Each antenna matrix provides beamforming gain and thus improve the link budget between the APU 22 and the UEs 12 that it serves, along with improves the interference situation in implementations where multiple chains 26 use the same radio carrier frequencies. Example matrix dimensions are 6 mm×12 mm for 100 GHz radio carrier signals, with the antenna elements 54 spaced at lambda/2 (1.5 mm).

The example APU 22 further includes antenna circuitry 40 that interfaces with the antenna array 24, a dielectric waveguide interface 42, and control circuitry 44 that may exchange control signaling on the upstream side and on the downstream side of the APU 22. For example, the CPU 20 may output control signaling for the APUs 22 in the chain 26 and each APU 22 in the chain may transfer some or all such signaling onto the next APU 22 in the chain. The signaling may be common to the A and B parts of the APU 22 or may be separate for the A and B parts, e.g., coordinated but separate signaling for A and B radio-carrier-signal polarizations handled by the APU 22. FIG. 3 illustrates such a case, where 46-1A denotes upstream-side control signaling associated with the A part of the APU 22, 46-1B denotes upstream-side control signaling associated with the B part of the APU 22, 46-2A denotes downstream-side control signaling associated with the A part of the APU 22, and 46-2B denotes downstream-side control signaling associated with the B part of the APU 22. Of course, this example not limiting and other control signaling arrangements are contemplated. In similar AB fashion, the DWG interface 42 of the APU 22 connects to two DWGs in each direction. That is, on SIDE 1 of the APU 22, the DWG interface 42 provides DWG coupling for two DWGs constituting the SIDE-1 DWG link 28-1. These two SIDE-1 DWGs are denoted as 30-1A and 30-1B, corresponding to the A and B parts of the APU 22. Likewise, the DWG interface 42 provides DWG coupling for two DWGs 30 constituting the SIDE-2 DWG link 28-2. These two SIDE-2 DWGs are denoted as 30-2A and 30-2B, corresponding to the A and B parts of the APU 22.

The DWG 30-1A on SIDE 1 "maps" to the DWG 30-2A on SIDE 2, meaning that in relay operation, the APU 22 couples radio carrier signals incoming to the APU 22 from the DWG 30-1A over to the DWG 30-2A, and vice versa. The same cross-side mapping applies for the DWGs 30-1B and 30-2B. In at least one embodiment, the 30-1A/30-2A pairing of DWGs handles a first radio-carrier-signal polarization, such as horizontal polarization, and the 30-1B/30-2B pairing of DWGs handles a second radio-carrier-signal polarization, such as vertical polarization. With TDD operation, only one DWG on either side of the APU 22 is needed per polarization.

Assuming that SIDE 1 is the upstream side of the APU 22, in downlink (DL) operation, also referred to as outbound operation, the DWGs 30-1A and 30-1B carry corresponding outbound radio carrier signals of "A" and "B" polarization, originated from the CPU 20 and propagated in the chain 26 towards the APU 22. If the APU 22 is operating as a relay station, its DWG interface 42 couples these outbound radio signals over to SIDE 2 of the APU 22, into the DWGs 30-2A and 30-2B, for the next APU 22 in the chain 26. Conversely, in base-station or transceiver mode, the DWG interface 42 of the APU 22 couples the outbound radio carrier signals incoming on DWGs 30-1A and 30-1B into the antenna circuitry 40, for OTA transmission from the antenna array 24 (the A and B antenna matrixes in FIG. 3).

Assuming, again, that SIDE 1 is the upstream side of the APU 22, in uplink (UL) operation, also referred to as inbound operation, relay-station operation of the APU 22 involves the APU 22 receiving inbound radio carrier signals on its downstream side (SIDE 2), i.e., on the DWGs 30-2A and 30-2B, where these signals were received via OTA reception by another APU 22 that is downstream in the chain 26. The APU 22 couples these inbound signals into the SIDE-1 DWGs 30-1A and 30-1B, for propagation towards the CPU 20. For base-station mode UL operation, the APU 22 receives an UL radio carrier signal from a UE 12 and couples it into its SIDE 1 DWG interface, for propagation towards the CPU 20 as an inbound radio carrier signal.

Another point worth emphasizing is that the AB segregations shown in FIG. 3 aid discussion, but they are not meant to suggest limitations on how an APU 22 may be implemented with respect to multiple polarizations. At least some aspects may be integrated. Other example elements illustrated in the APU 22 of FIG. 3 include a signaling interface 48 of the control circuitry 44, which may include two respective control interfaces 50, with the interface 50-1 for control-signaling connectivity on the upstream side of the APU 22 and the interface 50-2 for control-signaling connectivity on the downstream side of the APU 22. For example, the CPU 20 generates control signaling to control the APUs 22 included in a chain 26, such as TDD-related control signaling that determines the relay-station and base-station operations of individual APUs 22 in the chain 26. Such signaling may flow via serial control-signaling links between the CPU 20 and the successive APUs 22 in the chain 26, with the APU 22 closest to the CPU 20 receiving control signaling directly from the CPU 20 and passing all or some of it along to the next APU 22, and so on.

To this end, the control circuitry 44 in one or more embodiments comprises one or more microprocessors, Digital Signal Processors (DSPs), Field Programmable Gate Arrays (FPGAs), or Application Specific Integrated Circuits (ASICs), or any mix thereof. The control circuitry 44 may include or be associated with memory or other computer-readable media, and may operate according to the execution of stored computer program instructions. In at least one embodiment, the DWGs 30 comprising the DWG links 28 have a conductive exterior 52 that provides an electrical connection for exchanging control signaling between the CPU 20 and the adjacent APU 22, and between adjacent APUs 22. The conductive exterior 52 comprises, for example a metallic coating or a conductive sheathing. In other embodiments, dedicated wired connections independent of the DWG links 28 electrically interconnects the CPU 20 and the APUs 22. In either case, the control signaling includes, for example, TDD control signaling and mode control signaling, according to which the CPU 20 determines which APUs 22 transmit or receive OTA radio carrier signals at what times. Thus, the control signaling provides for operation of the APUs 22 as a distributed antenna system, where the CPU 20 schedules the transmission and/or reception of user traffic from respective UEs 12 served by the chain 26, via respective ones of the APUs 22 in the chain 26.

Each APU 22 may also include or be associated with a power management unit (PMU) 56. The PMU 56 provides operating power for the antenna circuitry 40, the DWG interface 42, and the control circuitry 44, for example. In at least some embodiments, the PMU 56 is controllable by the CPU 20 via the control signaling. In addition to the conductive exteriors 52 of the DWGs in the DWG links 28 carrying the control signaling, the conductive exteriors 52 also may be used to supply operating power, e.g. DC voltage down the chain 26 of APUs 22.

In a Power over Ethernet (POE) example, a 48 VDC power signal is carried via the conductive coatings 52 included in the respective DWG links 28. However, lower operating voltages may be used, e.g., to facilitate full monolithic integration of the circuitry comprising each APU 22. To some extent, the voltage drops incurred on the successive interconnections used to carry the control signaling down the chain 26 of APUs 22 may dictate the voltage level of the DC power signal and the PMU 56 of each APU 22 may include DC/DC converters, as needed, to provide the particular operating voltages needed within the APU 22. While carrying the control signaling over the power feed may be advantageous in terms of reduced complexity and parts count, the arrangement should be understood as a non-limiting example for the control-signaling interconnections. More broadly, the control signaling arrangement may be implemented as a parallel, low-frequency serial peripheral interface (SPI), with the CPU 20 outputting control signaling for respective ones of the APUs 22 via the SPI.

Each APU 22 has, for example, a unique identifier that allows the CPU 20 to identify which APU 22 is targeted by particular control signaling. Application Specific Integrated Circuits (ASICs) or other integrated circuitry used within each APU 22 may, for example, be fused with a unique identifier that fixes the APU's identity. Dynamic or configurable identities also may be used in one or more embodiments. An APU 22 that receives control signaling not targeted to it would pass it along the next control-signaling hop in the chain 26, in the downstream direction. Likewise, upstream control signaling would pass from APU 22 to APU 22 in the chain 26, as needed, to reach the CPU 20.

As noted, the CPU 20 uses the control signaling to, among other things, control the state of each APU 22 in the chain 26. Here, the possible states may be relay mode, base-station mode, and standby mode, as set under control of the CPU 20.

Figure 4:
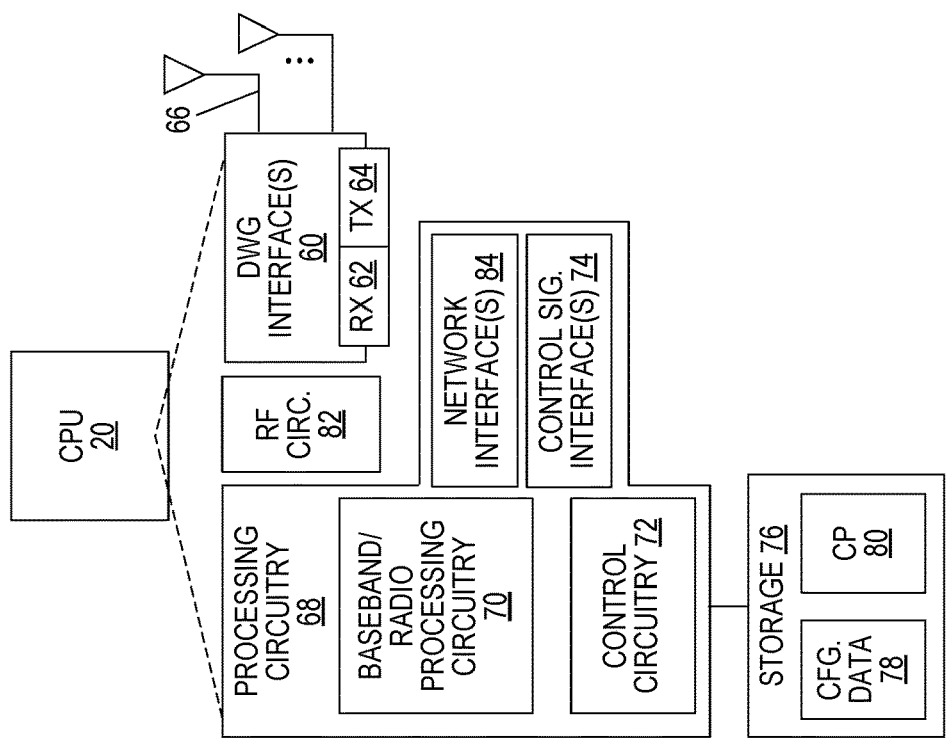
FIG. 4 is a block diagram of one embodiment of a central processing unit for use in a chain.

FIG. 4 illustrates an example arrangement for the CPU 20 in one or more embodiments.

The CPU 20 includes DWG interfaces 60, including receiving and transmitting circuitry 62 and 64, for coupling into the DWGs that comprise its DWG link 28 into the first APU 22 of a chain 26 of APUs 22 controlled by the CPU 20. In at least one embodiment, the DWG interface(s) 60 of the CPU 20 use antennas 66 to transmit outbound radio carrier signals into the associated DWG link 28 and to receive inbound radio carrier signals from the associated DWG link 28. The antennas 66 may be placed for lateral feeding into the associated DWG link 28, and the same arrangement may be implemented in each of the APUs 22, for coupling with their respective upstream and downstream DWG links 28.

The CPU 20 also includes processing circuitry 68, including baseband radio processing circuitry 70 for baseband processing of outbound and inbound signals corresponding to the outbound and inbound radio carrier signals. The CPU 20 further includes control circuitry 72 configured for controlling operation of the CPU 20 and for controlling one or more chains 26 of APUs 22 that are coupled to the CPU 20. To that end, the control circuitry 72 is associated with one or more control-signaling interfaces 74, e.g., SPI circuitry. The control circuitry 72 or the processing circuitry 68 at large also may be associated with one or more network interfaces 84, e.g., that support backhaul connections for carrying user traffic and related network-control signaling between the CPU 20 and one or more supporting nodes in the CN 18.

The processing circuitry 68 in one or more embodiments includes or is associated with storage 76, e.g., for storing configuration data 78 associated with the operation of the CPU 20 and/or one or more computer programs ("CP" in the diagram) comprising computer program instructions the execution of which by one or more microprocessors or other types of digital processors configure such processors as said processing circuitry 68. That is, the processing circuitry 68 may be fixed circuitry or programmed circuitry and, in at least one embodiment, the processing circuitry 68 is at least partly realized by one or more microprocessors being specially adapted according to their execution of computer program instructions stored in the storage 76.

Correspondingly, the storage 76 provides for at least temporary storage of the computer program(s) (CPs) 80 and also may provide working memory for program execution. Broadly, the storage 76 comprises one or more types of computer-readable media, with non-limiting examples including any one or more of SRAM, DRAM, NVRAM, FLASH, EEPROM, and Solid State Disk (SSD).

Figure 5:
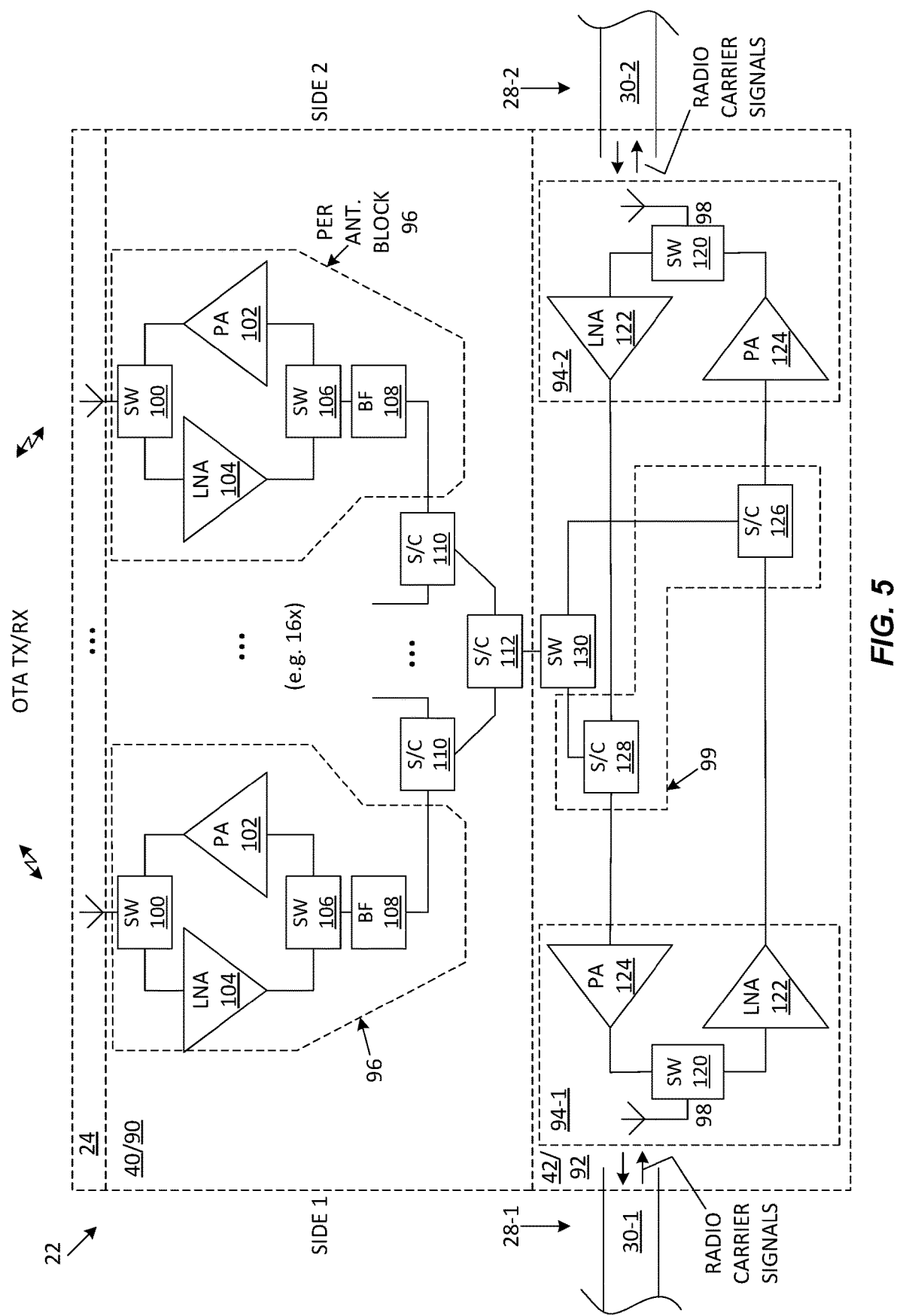
FIG. 5 is a schematic diagram of one embodiment of radiofrequency circuitry within a radio communications node.

The CPU 20 also includes radiofrequency circuitry 82 that is associated with the baseband radio processing circuitry 70 and with the DWG interfaces 60. In cooperation with the baseband radio processing circuitry 70, the CPU 20 uses the radiofrequency circuitry 82 to generate outbound radio carrier signals for output via the DWG interface(s) 60. Likewise, the CPU 20 uses the radiofrequency circuitry 82 to process inbound radio carrier signals received via the DWG interface(s) 60. In this regard, the CPU 20 can be understood as providing all modulation and frequency up-conversion processing for outbound radio carrier signals conveyed in the chain 26 of APUs 22, and providing all demodulation and frequency down-conversion processing for inbound radio carrier signals conveyed in the chain 26 of APUs 22. FIG. 5 illustrates an example embodiment of an APU 22, focusing on an example implementation of the DWG interface 42 and the antenna circuitry 40. The antenna circuitry 40 includes first radiofrequency circuitry 90 and the DWG interface 42 includes second radiofrequency circuitry 92.

In an example case, the antenna array 24 includes sixteen antenna elements for transmission and/or reception beamforming, and the first radiofrequency circuitry 90 includes a corresponding block 96 of radiofrequency circuitry per antenna element of the antenna array 24. Each block 96 includes a switch 100, a power amplifier (PA) 102, a low noise amplifier (LNA) 104, a switch 106, a beamforming circuit element 108, and a splitter/combiner (S/C) 110.

The second radiofrequency circuitry 92 comprises respective DWG coupling circuits 94-1 and 94-2. Each DWG coupling circuit 94 provides for transmit/receive coupling via an associated antenna 98 into a DWG 30. To the extent that the APU 22 supports more than one DWG 30 per DWG link 28, it will have a DWG coupling circuit 94 per DWG 30. Going back momentarily to FIG. 3, the depicted APU 22 would include two DWG coupling circuits 94 on SIDE 1, one for the SIDE-1 A connection and one for the SIDE-1 B connection, and two DWG coupling circuits 94 on SIDE 2, one for the SIDE-2 A connection and one for the SIDE-2 B connection.

Further, as seen in FIG. 5, each DWG coupling circuit 94 on one side of the APU 22 is paired with—coupled to—a corresponding DWG coupling circuit 94 on the other side of the APU 22. That is, each DWG coupling circuit 94 on the upstream side of the APU 22 has a corresponding DWG coupling circuit 94 on the downstream side of the APU 22. These complementary pairings, the upstream/downstream pairings, provide for the coupling of radio carrier signals from an upstream DWG 30 into a corresponding downstream DWG 30—i.e., next-hop conveyance. In the diagram, transfer circuitry 99 provides such coupling between the DWG coupling circuit 94-1 and the DWG coupling circuit 94-2.

For relay operation of an outbound radio signal and assuming that SIDE 1 is the upstream side of the APU 22 and that SIDE 2 is the downstream side, an outbound radio carrier signal appears on the DWG 30-1 and the switch 120 of the DWG coupling circuit 94-1 (upstream coupler) is set for receiving, such that the outbound radio carrier signal radiates from the upstream DWG 30-1 and is coupled to the input of the LNA 122 of the upstream coupler. The LNA 122 of the upstream coupler outputs the outbound radio carrier signal with amplification and applies it to an S/C 126 of the transfer circuitry 99. In turn, the S/C 126 applies the outbound radio carrier signal to the input of a PA 124 of the DWG coupling circuit 94-2 (downstream coupler). The PA 124 outputs the outbound radio carrier signal with power amplification, and a switch 120 of the downstream coupler is set for transmission, meaning that the outbound radio carrier signal is launched via the antenna 98 of the downstream coupler into the downstream DWG 30-2.

For relay operation of an inbound radio signal and assuming that SIDE 1 is the upstream side of the APU 22 and that SIDE 2 is the downstream side, an inbound radio carrier signal appears on the DWG 30-2 and the switch 120 of the downstream coupler is set for receiving, such that the inbound radio carrier signal radiates from the downstream DWG 30-2 and is coupled to the input of the LNA 122 of the downstream coupler. The LNA 122 of the downstream coupler outputs the inbound radio carrier signal with amplification and applies it to an S/C 128 of the transfer circuitry 99. In turn, the S/C 128 applies the outbound radio carrier signal to the input of a PA 124 of the upstream coupler. The PA 124 of the upstream coupler outputs the inbound radio carrier signal with power amplification, and the switch 120 of the upstream coupler is set for transmission, meaning that the inbound radio carrier signal is launched via the antenna 98 of the upstream coupler into the upstream DWG 30-1.

For base-station operation with respect to an outbound radio carrier signal received at the APU 22 via the upstream coupler, the S/C 126 of the transfer circuitry 99 applies outbound radio carrier signal to a SW 130 that couples it into an S/C 112 of the antenna circuitry 40. The S/C 112 and S/Cs 110 split/distribute the outbound radio signal into the respective per-antenna blocks 96. In embodiments where the APU 22 performs transmit beamforming, the split radio carrier signal into each of the antenna blocks 96 is weighted by the beamforming circuit element 108 and the switches 106 and 100 are set for transmission, meaning that the split and weighted radio carrier signal passes to the input of the PA 102, for power amplification and OTA transmission from the associated antenna element.

For base-station operation with respect to an OTA radio carrier signal received at the APU 22 via its antenna array 24, the switches 100 and 106 of each antenna block 96 are set for receive, meaning that an antenna-received radio carrier signal appears at the input of the LNA 104 in each antenna block 96, which provides low-noise amplification for the antenna-received radio carrier signal and applies it to the beamforming circuit element 108. In embodiments of the APU 22 that perform receive beamforming, the beamforming circuit element 108 applies a weighting to the radio carrier signal output from the LNA 104 and provides it to a respective one of the S/Cs 110, which combine the radio carrier signals incoming from each of the antenna blocks 96. Correspondingly, the S/C 112 forms a combined radio carrier signal, e.g., a combination of the weighted radio carrier signals output from the respective beamforming circuit elements 108 of the antenna blocks 96 and couples the combined radio carrier signal into the switch 130, which is set for inbound base-station operation and, therefore, couples it into the S/C 128.

In turn, the S/C 128 couples the combined radio carrier signal to the PA 124 of the upstream coupler, which provides power amplification for it and applies it to the switch 120 of the upstream coupler. The switch 120 is configured for transmission, meaning that the combined radio carrier signal from the PA 124 of the upstream coupler is launched into the upstream DWG 30-1, as an inbound radio carrier signal, for propagation in the chain 26 towards the CPU 20.

It will be understood that the selective operation of the SWs 100, 106, 120, and 130, as well as other modally-controlled elements of the first and second radiofrequency circuitry 90 and 92 of the APU 22 are controlled within the APU 22 by the control circuitry 44 of the APU 22, in dependence on the operational state of the APU 22. In turn, the control circuitry 44 of the APU 22 controls the operational state of the APU 22 in dependence on the control signaling targeted to it by the CPU 20. In this respect, the various SWs and S/Cs within the radio frequency circuitry 90 and 92 can be considered as part of the control circuitry 44.

Similarly, the beamforming solutions used by the APU 22 for transmit and/or receive antenna beamforming—i.e., the dynamically configured sets of antenna weights collectively applied by the beamforming circuit elements 108 of the antenna blocks 96—may be determined by the CPU 20 and conveyed to the APU 22 via the control signaling. As such, the control circuitry 44 of the APU 22 includes or interfaces to the beamforming circuit elements 108, to set the per-antenna weights applied to the radio carrier signals incoming from the antenna array 24 or outgoing to the antenna array 24.

As seen in FIG. 5, the same or similar RF-circuit building blocks are used to implement the antenna circuitry 40 and the DWG interface 42. Notably, the elimination of frequency-conversion blocks and mixed-mode circuits from the radio-carrier-signal paths within the APU 22 relaxes the requirements on the integrated-circuit process choices available for implementation of these parts of the APU 22. As a further advantage, the absence of filters from the radio-carrier-signal paths within the APU 22 enables full monolithic integration of the circuit elements comprising the antenna circuitry 40 and the DWG interface 42. Before turning to FIG. 6, recall that "cell-free massive MIMO" refers to a massive MIMO system where the BS antennas are geographically spread out, such that each UE 12 can be served by more than one APU 22 and do not experience "cell boundaries" in a conventional sense. A CPU 20 and one or more APUs 22 form a chain 26, with the chain interconnected via a fronthaul network comprising respective DWG links 28 providing serial hops from the CPU 20 to the first APU 22 in the chain 26 and to each next APU 22 in the chain 26. This scheme provides for relatively dense deployments of APUs 22 via multiple chains 26 and the UEs 12 enjoy corresponding radio-link improvements because each UE 12 generally is close to at least one APU 22.

Figure 6:
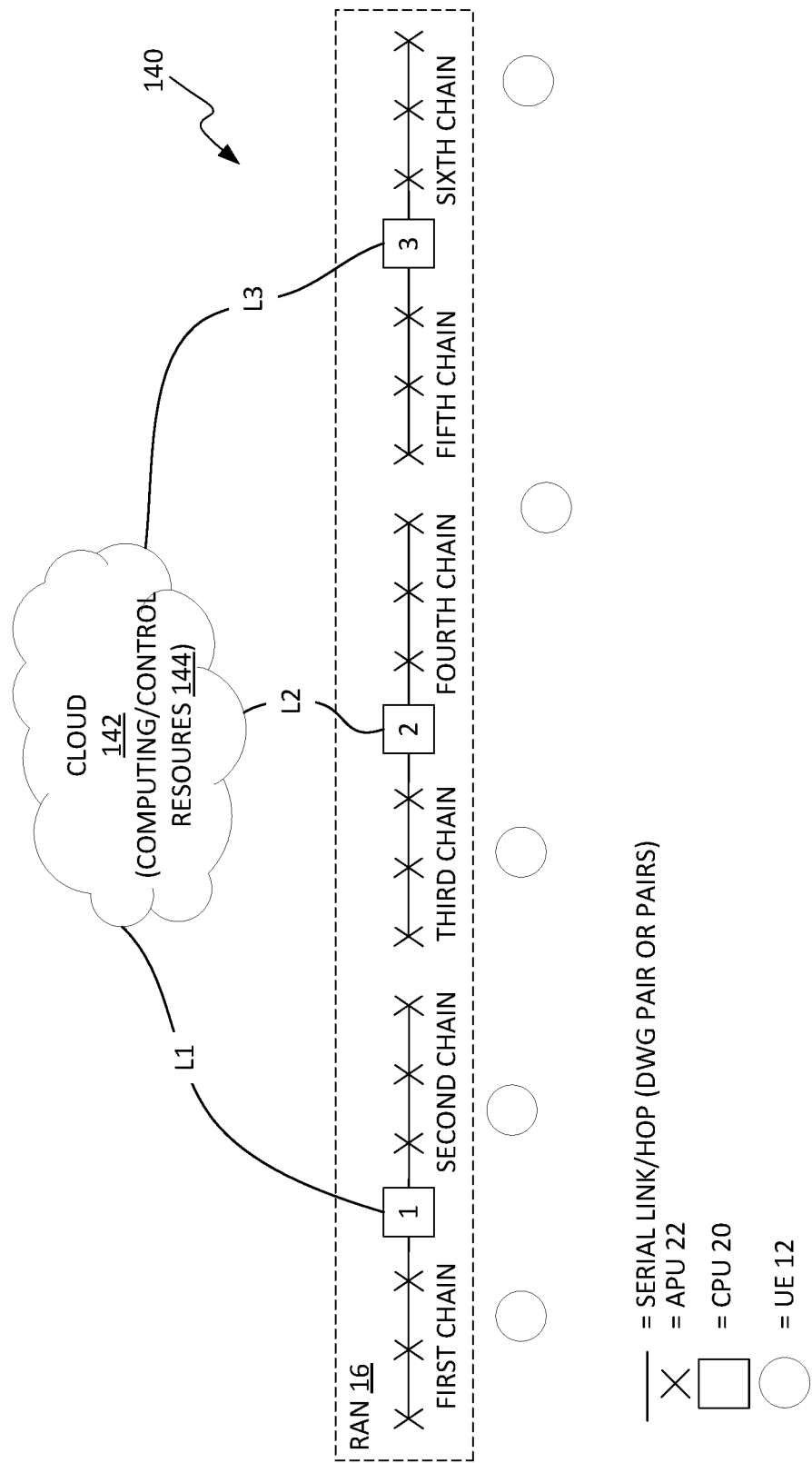
FIG. 6 is a block diagram illustrating one embodiment of a system comprising multiple chains.

Also, as noted, each UE 12 may be close to two or more APUs 22, thereby providing for increased connection reliability between the UE 12 and the network 10. FIG. 6 illustrates a possible "system" arrangement, wherein three CPUs 20 each anchor two respective chains 26 of APUs 22, with CPU "1" in the diagram anchoring a first chain and a second chain, CPU "2" anchoring a third chain and a fourth chain, and CPU "3" anchoring a fifth chain and a sixth chain. These chains may be arrayed or disposed within and around an overall coverage area of interest, according to a devised deployment strategy that provides for the likelihood that given UEs 12 within the overall coverage area will be relatively close to two or more APUs 22.

In a contemplated radio communications system 140 that may function as part of the network 10, a "cloud" 142 comprises computing/control resources 144 for interacting with the CPUs 20, and may represent virtualized processing resources constituting parts of the RAN 16 and/or CN 18 of the network 10 introduced in FIG. 1. For example, the cloud 142 includes links L1, L2, L3, to the respective CPUs 1, 2, and 3 in the diagram, for control-plane signaling and/or user-plane signaling related to the UEs 12 being served by the CPUs 1, 2, and 3.

However, while the system depiction seen in FIG. 6 offers the cell-free connection reliability advantages alluded to earlier, any serial chain 26 of a CPU 20 and one or more APUs 22 remains vulnerable to certain failure events. For example, a failure of the CPU 1 would leave the first and second chains inoperative, a failure of the CPU 2 would leave the third and fourth chains inoperative, and a failure of the CPU 3 would leave the fifth and sixth chains inoperative.

Further, consider APU failures that "break" the communicative serial linking represented by a given chain 26. For example, assume that the middle APU 22 in the second chain fails in a way that breaks the communicative linking of radio carrier signals and/or control signals, meaning that the CPU 1 can no longer "reach" the terminal APU 22 (the rightmost) APU 22 in the second chain. Note that such failures may affect one or both polarizations or one or multiple individual DWGs in cases where the DWG links 28 between APUs 22 include more than one DWG. And, similarly, failures in the DWG links 28 or the related control-signaling interconnections can leave APUs 22 that are downstream of the failure unreachable in a radio-carrier-signal sense and/or uncontrollable in a control-signaling sense.

CPU failures thus affect potentially large portions of the overall coverage or service area and APU and/or serial-linking failures affect all APUs 22 that are downstream of the failure, which, again, may involve large portions of the overall coverage or service area.

Figure 7:
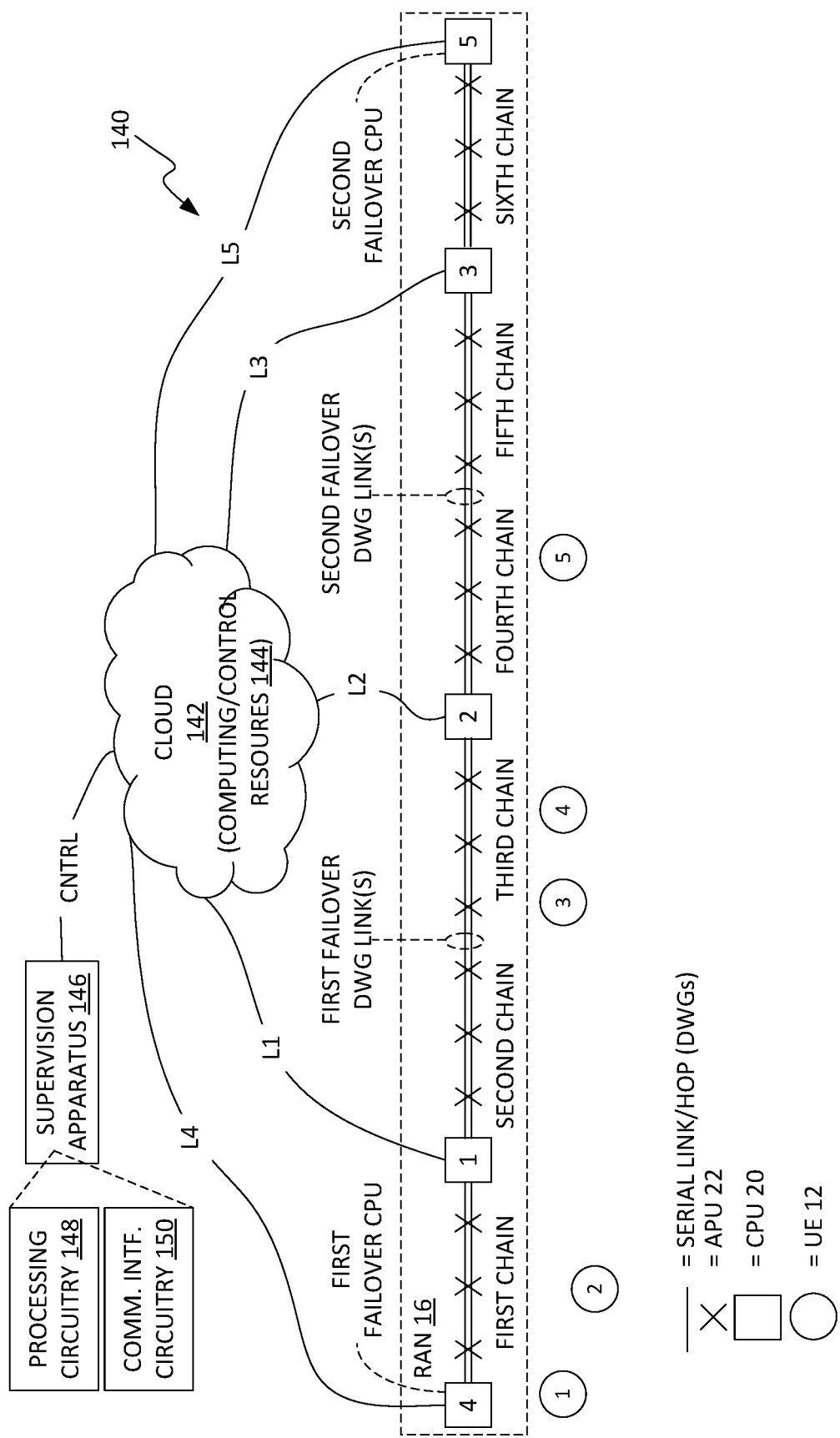
FIG. 7 is a block diagram illustrating another embodiment of a system comprising multiple chains, with features providing failover operation and/or increased system capacity.

FIG. 7 illustrates a modified version of the arrangement introduced in FIG. 6, with additional elements included for increased robustness via failure handling. Specifically, the "system" depicted in FIG. 7 differs from that seen in FIG. 6 in that it includes two additional DWG links 28, labeled as first and second failover DWG links, and two additional CPUs 20, labeled as first and second failover CPUs.

The first failover DWG link operates to couple the terminal APU in the second chain to the terminal APU in the third chain, while the second failover DWG link operates to couple the terminal APU in the fourth chain with the terminal APU in the fifth chain. Further, the first failover CPU couples to the terminal APU in the first chain and the second failover CPU couples to the terminal APU in the sixth chain. By virtue of this arrangement, every APU in the overall chain or "super-chain" formed by the serial interconnection of the first through the sixth chains means that every APU can be connected to either of two CPUs. In turn, that fact means that if a CPU, an APU, or a DWG link fails within the super-chain, the super-chain can nonetheless continue providing full coverage for the corresponding service area(s), although it may operate with degraded system capacity in the sense that more UEs 12 may be sharing the same CPU/APU/DWG-link resources.

Further in FIG. 7, the cloud 142 includes a supervision or supervisory apparatus 146, which includes processing circuitry 148 and communication interface circuitry 150. These elements of the supervision apparatus 146 are configured to monitor the status of the respective chains 26, e.g., the first through the sixth chains, e.g., via the links L1, L2, L3, L4, and L5. Upon a malfunction, the "master" CPU of the affected APUs is automatically changed and an alarm is triggered. Here, "master" CPU refers to the CPU that is currently controlling a given series of APUs. In one operational example, in normal operation the CPU 1 is the master CPU for the APUs in the first chain and for the APUs in the second chain. And the CPU 2 is the master CPU for the APUs in the third and fourth chains.

Upon detecting a failure of the CPU 1, the supervisor apparatus 146 activates the first failover CPU (CPU 4 in the diagram) as the new master CPU for the first chain of APUs, activates the first failover DWG link, and reconfigures the CPU 2 so that it operates as the master CPU for a combined chain that includes the second and third chains. Notably, these master-CPU reassignments "reverse" the directional sense of the affected chains, such that the old upstream direction becomes the new downstream direction and the old downstream direction becomes the new upstream direction. Correspondingly, the advantageous arrangement of the second radiofrequency circuitry 92 comprising the DWG interface 42 of each APU 22 seamlessly allows for these changes in directional sense, as the DWG interface 42 is operative to transfer radio carrier signals from its SIDE-1 DGW link 28 to its SIDE-2 DWG link 28 and vice versa, via simple control of a couple of radiofrequency SWs and S/Cs.

Thus, in normal operation, the system of FIG. 7 may work like the system of FIG. 6, with the failover elements being inactive. The supervision apparatus 146, which could be replicated in one or more copies for increased reliability, regularly pings or communication with the CPUs and APUs in the respective chains. Upon detecting a failure, the supervisory apparatus 146 triggers an alarm and undertakes appropriate reconfiguration to remediate the failure.

As an example, assume that a first APU in the third chain serves the UE 4 and that a third APU in the third chain serves the UE 3. If the first APU in the third chain fails, the second and third APUs in that chain cannot be reached and/or controlled properly by the CPU 2. Correspondingly, the UEs 3 and 4 both lose their service connections. To remediate this circumstance, the supervisory apparatus 146 activates the first failover DWG link, and changes the second and third APUs in the third chain to operate with CPU 1 as their new master CPU. The second failover DWG link provides similar flexibility. And, at large, either of the respective failover CPUs (CPUs 4 and 5 in the drawing) can operate as the master CPU for the entire super-chain, if necessary. Again, however, with more UEs 12 being supported by one CPU, the system may operate at reduced throughput with respect to any particular one of the UEs 12 that are time-sharing the system resources.

Figure 8:
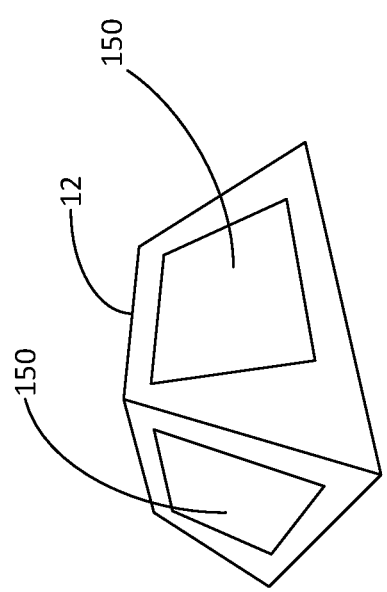
FIG. 8 is a block diagram illustrating one embodiment of a user equipment (UE).

FIG. 8 illustrates an example embodiment of a UE 12, which comprises processing circuitry and communication interface circuitry (not shown in the diagram). The processing circuitry may be fixed or programmed circuitry or some combination thereof, e.g., one more digital processors that are configured according to their execution of computer-program instructions. The communication interface circuitry comprises, for example, radiofrequency circuitry that is configured to receive downlink signals via the air interface of the network 10 and transmit uplink signals via that air interface. Thus, the processing circuitry operates controls or coordinates with the communication interface structure, for the transmission and reception of radiofrequency carrier signals according to the radio signal structure (timing, frames, slots, etc.) used by the network 10.

Further, the example UE 12 includes four physical "sides," with two of the sides shown in the perspective view provided. Each side of the UE 12 includes an antenna array 150, also referred to as a "panel." A given UE 12 can enable two panels and benefit from doubled peak bitrate, based on using each panel to transmit/receive to a different APU. The APUs "facing" on each side of a UE 12 in a directional sense can always get data from different chain directions. This arrangement, however, may require a change of master CPU for some APUs, where the master change can be triggered in response to a UE 12 requesting a very high peak rate.

In more detail, consider UE 3 in FIG. 7. In a "normal" operation scenario, UE 3 and UE 4 are served via the third chain, and, therefore, time-share the capacity of that chain, e.g., the UE 3 is served at certain times and the UE 4 is served at certain other times, with the respective times being mutually exclusive. Here, assume that the physical locations of the UEs 3 and 4 are such that the UE 3 can be served by either second APU in the third chain or by the last APU in the third chain.

In a case where the UE 3 needed higher bitrates than can be supported via the time-sharing happening on the third chain, the supervisory apparatus 146 could activate the first failover DWG link and reconfigure the last (terminal) APU in the third chain for operation with the CPU 1 as its new master. This allows the bandwidth/capacity of CPU 1 and the associated DWG links 28 of the extended second chain to serve the UE 3, while the UE 3 can also be served by the third chain, in time-sharing arrangement with the UE 4.

When changing the master CPU of a series set of APUs, the number of series connected APU typically increases which degrades the Signal-to-Noise-and-Distortion Ratio (SNDR). Assuming each APU adds an equal amount of noise and distortion, signal quality is degraded by 10*log10 (#APUs). That is if number of APUs is doubled, SNDR due to the interface drops 3 dB. This is considered as an acceptable degradation, giving somewhat lowered peak rate data coverage.

The control circuitry 44 depicted for an example APU 22 in FIG. 3 supports such flexibility by controlling the state of the APU 22 and managing the directional sense of the APU 22 to allow for master-CPU reassignment. In one or more embodiments, each APU 22 can be in one of a standby mode, a repeater mode, or a transceiver mode. An APU 22 that is downstream of an APU 22 operating in transceiver mode can be in standby mode. An APU 22 that is upstream from the transceiving APU 22 operates in repeater (relay) mode for coupling the active APU 22 to the CPU 20.

The control circuitry 44 listens to control messages from both the upstream and downstream directions. The upstream direction faces the current master CPU 20 of the APU 22 and the control circuitry 44 responds to incoming control messages from the current master CPU 20. The downstream direction faces the terminal end of the chain 26 that includes the APU 22 and the control circuitry 44 listens for commands coming in that direction, signaling a change in the master CPU 20. And, of course, the control circuitry 44 is operative to receive control messages from the master CPU 20 and forward/relay them on to the next APU 22 in the chain 26.

Control messages can either be forwarded in either chain direction or not forwarded at all. In an example embodiment, at startup, all APUs 22 in a chain 26 are in standby and set to not forward control messages. The CPU 20 operating as the master first activates the closest APU(s) 22 in the chain(s) 26 that it anchors, selects itself as master and the instructs the APU 22 to forward control messages. Then the next APU 22 in each chain 26 anchored by the CPU 20 is activated and this goes on until all APU 22 belonging to each CPU 20 are activated. The last of the series connected APUs 22, the chain-terminating APUs 22, are asked not to perform next-hop forwarding.

Thus, if the master CPU 20 needs to change for the chain 26, the APU 22 in the chain 26 that is furthest away from the older master CPU 20 receives control signaling on its downstream side, originating from the new master CPU 20 and requesting the APU 22 to forward control signaling from the new master CPU 20 in the old upstream direction of the chain 26, to sequentially reconfigure each of the remaining APUs 22 in the chain 26 to change their master-CPU affiliation. When not transmitting control signaling, the control-signaling interface(s) 48 of the control circuitry 44 may be placed in a high Ohmic state, to prevent contention with the APU 22 and/or CPU 20 at the other end of its serial control-signaling link.

Figure 9:
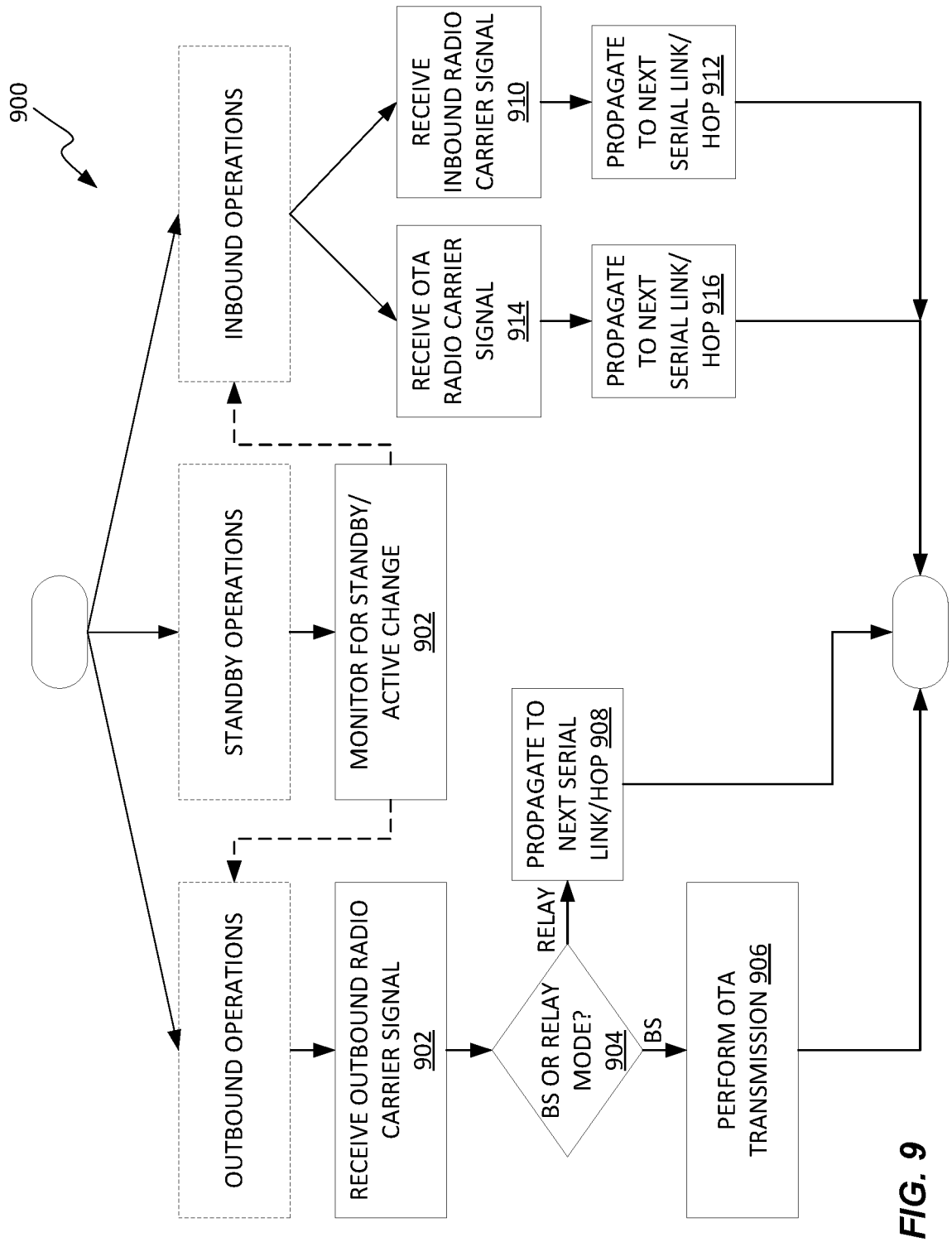
FIG. 9 is a logic flow diagram illustrating one embodiment of a method of operation by a radio communications node in a chain.

FIG. 9 illustrates an example method 900 of operating an APU 22, which is also referred to herein as a radio communications node (RCN) 22. The method 900 contemplates that the radio communications node 22 that is positioned as one in a serial linking of radio communications nodes 22. Here, the serial linking may be regarded as a chain 26, formed using interconnecting dielectric waveguides as DWG links 28 that represent serial links or hops that serially interconnect the radio communications nodes 22 to a central processing unit 20 that anchors the chain 26 and sends outbound radio carrier signals via the serial linking, for over-the-air transmission by specific ones of the radio communications nodes 22, and receives inbound radio carrier signals via the serial linking, for processing by the central processing unit 20. The central processing unit 20 may also be referred to as a CPU or as a central processing node or CPN.

The method 900 includes receiving (block 902) an outbound radio carrier signal going in an outbound direction along the serial linking and performing (block 906) an over-the-air transmission of the outbound radio carrier signal, in a case where the outbound radio carrier signal targets a user equipment 12 served by the radio communications node 22 ("BS" path from block 904), and propagating (block 908) the outbound radio carrier signal along a next outbound hop of the serial linking, in a case where the outbound radio carrier signal does not target a user equipment 12 served by radio communications node 22 ("RELAY" path from block 904).

The method 900 also includes, perhaps at a different time instant or interval, receiving (block 910) an inbound radio carrier signal going in an inbound direction along the serial linking and propagating (block 912) the inbound radio carrier signal along a next inbound hop of the serial linking.

Still further, possibly at yet another time interval or instant, the method 900 includes the APU 22 receiving (block 914) a radio carrier signal as an over-the-air transmission from a user equipment 12 served by the radio communications node 22 and propagating (block 916) the received radio carrier signal along the next inbound hop of the serial linking as an inbound radio carrier signal.

Figure 10:
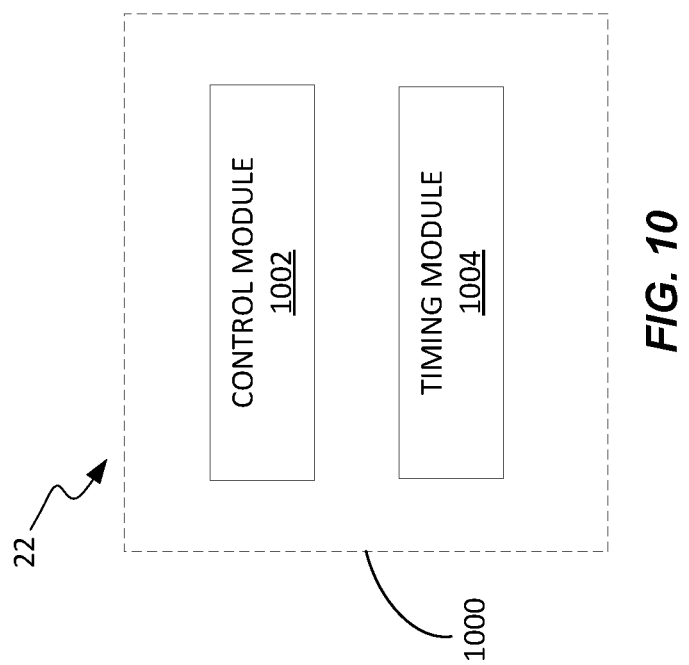
FIG. 10 is a block diagram of another embodiment of a radio communications node.

FIG. 10 illustrates another embodiment of an APU 22, which may be realized at least in part as set 1000 of functional processing "units" or "modules" via programmatic configuration of computer-processing circuitry, e.g., one or more microcontrollers. The APU 22 includes a control module 1002 that is configured to receive control messages from a master CPU, either directly or from a next-adjacent APU 22 in the chain 26 that includes the APU 22.

The control module 1002 controls the operation of the APU 22 responsive to the control signaling and may pass some or all of the control signaling downstream to a next-adjacent APU 22 in the chain 26. For example, with respect to FIG. 5, the control module 1002 provides discrete control signals to control the state or operation of the various switches and splitter/combiners comprising the antenna circuitry 40 and the DWG interface 42 of the APU 22, according to whether the APU 22 is to operate in a standby state or mode, a base-station (transceiver) state or mode, or a repeater (relay) state or mode. Further included in the set 1000 is a timing module 1004, which is configured to maintain timing of the APU 22, e.g., in relation to or dependence on timing information conveyed in the control signaling.

Figure 11:
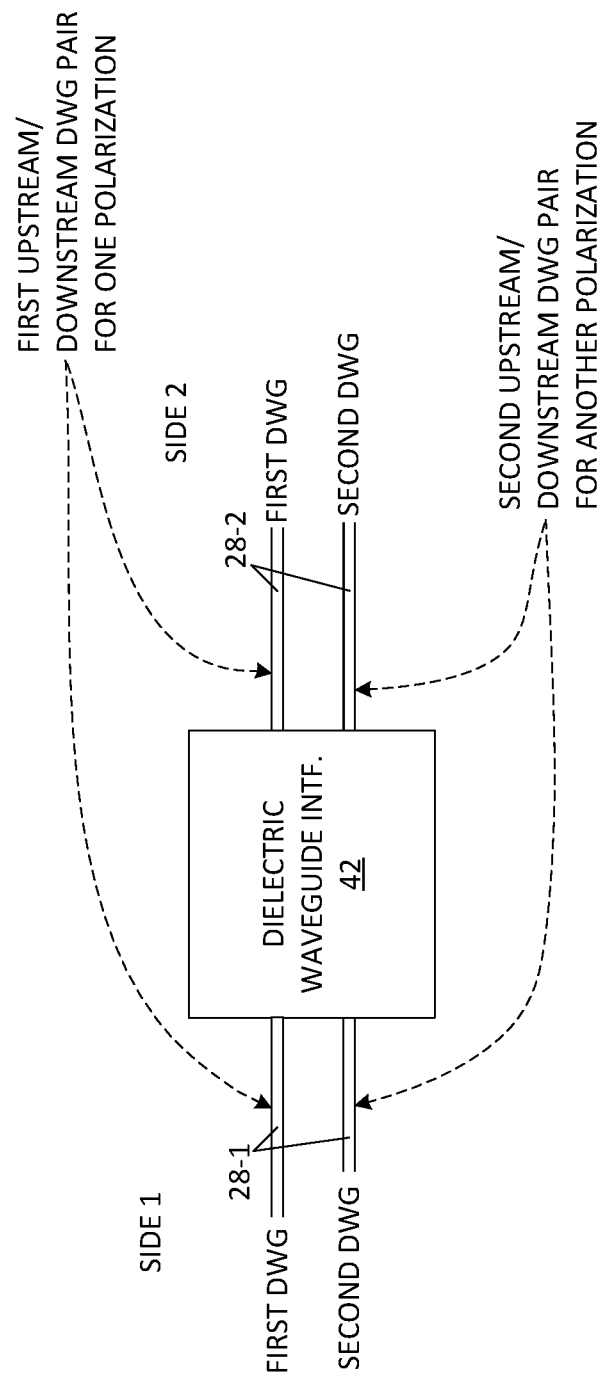
FIG. 11 is a block diagram of one embodiment of a DWG interface configured for use by a radio communications node in a chain.

FIG. 11 illustrates one embodiment of a DWG-interface 42 contemplate for an APU 22 and elaborates earlier details about supporting multiple polarizations. The DWG link 28-1 on SIDE 1 of the involved APU 22 includes first and second DWGs, with each one corresponding to a different radio-carrier-signal polarization. That is, each APU 22 may support transmission and/or reception using two different polarizations.

Likewise, the DWG link 28-2 on SIDE 2 of the involved APU 22 includes first and second DWGs, with each one corresponding to one of the different radio-carrier-signal polarizations. In particular, the first DWG of the DWG link 28-1 pairs with or corresponds to the first DWG of the DWG link 28-2, meaning that they are a complementary upstream/downstream DWG pair, for handling upstream/downstream conveyance of radio carrier signals associated with a first polarization. The second DWG of the DWG link 28-1 pairs with or corresponds to the second DWG of the DWG link 28-2, meaning that they are a complementary upstream/downstream DWG pair, for handling upstream/downstream conveyance of radio carrier signals associated with a second polarization.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A radio communications system comprising:
  a central processing unit and two or more radio communication nodes serially connected as chain, with each serial link in the chain comprising a dielectric waveguide link, and each serial link having a downstream direction away from the central processing unit and an upstream direction towards the central processing unit;
  wherein the central processing unit is configured to control individual ones of the radio communications nodes to operate as base stations or relay stations;
  wherein any given radio communications node operating as a base station either:
    receives an outbound radio carrier signal generated by the central processing unit and propagated via the chain in the downstream direction, and transmits the outbound radio carrier signal over the air, as a downlink radio carrier signal for reception by one or more user equipments served by the base station; or
    receives a radio carrier signal over the air, as an uplink radio carrier signal originating from one of the user equipments served by the base station and propagates the received radio carrier signal via the chain in the upstream direction, for processing by the central processing unit; and
  wherein any given node operating as a relay station either:
    receives inbound radio carrier signals propagating in the chain in the upstream direction and propagates them to the next upstream hop in the chain; or
    receives outbound radio signals propagating in the chain in the downstream direction and propagates them to the next downstream hop in the chain.

2. A radio communications node comprising:
  antenna circuitry configured for over-the-air transmission of radio carrier signals via an antenna array and over-the-air reception of radio carrier signals via the antenna array; and
  a dielectric waveguide interface coupled to the antenna circuitry and configured for a series interconnection of the radio communications node, the dielectric waveguide interface including a first coupling circuit for transmitting radio carrier signals into a first dielectric waveguide and receiving radio carrier signals from the first dielectric waveguide, and further including a second coupling circuit for transmitting radio carrier signals into a second dielectric waveguide and receiving radio carrier signals from the second dielectric waveguide; and
  wherein the radio communications node further comprises control circuitry that configures the radio communications node for relay operation or base-station operation, and wherein:
    in base-station operation, radio carrier signals received by the antenna circuitry via over-the-air reception are coupled into the dielectric interface and transmitted into at least one of the first and second dielectric waveguides, and radio carrier signals received by the dielectric waveguide interface are coupled into the antenna circuitry for over-the-air transmission; and
    in relay operation, radio carrier signals received from the first dielectric waveguide via the first coupling circuit are coupled to the second coupling circuit and transmitted into the second dielectric waveguide, and radio carrier signals received from the second dielectric waveguide via second coupling circuit are coupled to the first coupling circuit and transmitted into the first dielectric waveguide, and wherein the control circuitry is configured to output control signaling that indicates timing for Time Division Duplexing (TDD) operation of the radio communications node, such that, in base-station operation, the radio communications node either receives or transmits via the antenna circuitry and the associated antenna array, and such that, in relay operation, the radio communications node either relays radio signals towards the central processing unit or relays radio signals away from the central processing unit.

3. The radio communications node of claim 2, wherein the central processing unit is a first central processing unit associated with a first end of the serial linking and wherein a second central processing unit is associated with the other end of the serial linking, and wherein, responsive to the supervisory signaling incoming to the radio communications node indicating a change in control from the first central processing unit to the second central processing unit, the control circuitry is configured to re-configure the radio communications node to swap the upstream and downstream coupling roles played by the first and second coupling circuits.

4. The radio communications node of claim 2, wherein the first coupling circuit comprises a first set of coupling circuits and the second coupling circuit comprises a second set of coupling circuits, and wherein each coupling circuit in the first set maps to a respective one of the coupling circuits in the second set as an upstream/downstream coupler pair and each upstream/downstream coupler pair handles a different polarization of radio carrier signals.

5. The radio communications node of claim 4, wherein, for each polarization of radio carrier signals handled by the radio communications node, there are two or more upstream/downstream coupler pairs, such that the radio communications node is operative to relay and/or transceive two or more radio carrier signals simultaneously.

6. A method of operating a radio communications node that is positioned as one in a serial linking of radio communications nodes, the serial linking comprising interconnecting dielectric waveguides, referred to as DWG links or hops and serially interconnecting the radio communications nodes to a central processing unit that anchors the serial linking and sends outbound radio carrier signals via the serial linking, for over-the-air transmission by specific ones of the radio communications nodes, and receives inbound radio carrier signals via the serial linking, for processing by the central processing unit, and the method comprising:

receiving an outbound radio carrier signal going in an outbound direction along the serial linking and performing an over-the-air transmission of the outbound radio carrier signal, in a case where the outbound radio carrier signal targets a user equipment served by the radio communications node, and propagating the outbound radio carrier signal along a next outbound hop of the serial linking, in a case where the outbound radio carrier signal does not target a user equipment served by radio communications node;

receiving an inbound radio carrier signal going in an inbound direction along the serial linking and propagating the inbound radio carrier signal along a next inbound hop of the serial linking; and receiving a radio carrier signal as an over-the-air transmission from a user equipment served by the radio communications node and propagating the received radio carrier signal along the next inbound hop of the serial linking as an inbound radio carrier signal.

7. A radio communications node comprising:

a dielectric waveguide interface comprising second radiofrequency circuitry configured to pass radio carrier signals received via one of two respective coupling circuits of the dielectric waveguide interface either to the other one of the two respective coupling circuits, or to antenna circuitry of the radio communications node, wherein each coupling circuit is configured for transmitting radio carrier signals into and receiving radio carrier signals from a respective dielectric waveguide comprised in DWG link or hop and used to couple the radio communications node to another radio communications node or a central processing unit that provides processing for all radio carrier signals handled by the radio communications node;

wherein the antenna circuitry comprises first radio frequency circuitry configured to transmit, via an associated antenna array, radio carrier signals passed to the antenna circuitry from the dielectric waveguide interface, and pass, to the dielectric waveguide interface, radio carrier signals that are received via the antenna array; and control circuitry comprising a signaling interface circuit for exchanging control signaling directly or indirectly with the central processing unit and configured to control the dielectric waveguide interface and antenna circuitry responsive to the control signaling.

8. The radio communications node of claim 7, wherein the radio communications node is configured for Time Division Duplexing (TDD) operation, in which transmission and reception of radio carrier signals are mutually exclusive for the antenna circuitry, and for each coupling circuit of the dielectric waveguide interface.

9. The radio communications node of claim 8, wherein the control circuitry is configured to control the TDD operations of the antenna circuitry and the dielectric waveguide interface.

10. The radio communications node of claim 7, wherein the antenna circuitry is configured for at least one of reception beamforming via the antenna array and transmission beamforming via the antenna array, wherein the control signaling includes beamforming control signaling, and wherein the control circuitry controls the reception or transmission beamforming of analog beamforming circuit element in the antenna circuitry, according to the beamforming control signaling.

11. The radio communications node of claim 7, wherein the signaling interface circuitry is configured to electrically couple with a conductive exterior used on the respective dielectric waveguides comprising the DWG links that couple to the radio communications node.

12. A radio communications node comprising:

antenna circuitry configured for over-the-air transmission of radio carrier signals via an antenna array and over-the-air reception of radio carrier signals via the antenna array; and a dielectric waveguide interface coupled to the antenna circuitry and configured for a series interconnection of the radio communications node in a serial linking of two or more radio communications nodes with a central processing unit that controls the radio communication nodes, the dielectric waveguide interface including a first coupling circuit for transmitting radio carrier signals into a first dielectric waveguide and receiving radio carrier signals from the first dielectric waveguide, and further including a second coupling circuit for transmitting radio carrier signals into a second dielectric waveguide and receiving radio carrier signals from the second dielectric waveguide;

wherein the coupling circuit that faces towards the central processing unit in the series interconnection serves an upstream coupler and the coupling circuit that faces away from the central processing unit in the series interconnection serves a downstream coupler; and wherein the radio communications node further comprises control circuitry that, responsive to control signaling originating from the central processing unit, configures the radio communications node for relay operation or base-station operation, and wherein:

in base-station operation, radio carrier signals received by the antenna circuitry via over-the-air reception are coupled into the dielectric interface and transmitted via the upstream coupler towards the central processing unit for processing, and radio carrier signals received by the dielectric waveguide interface via the upstream coupler are coupled into the antenna circuitry for over-the-air transmission; and in relay operation, radio carrier signals received via the upstream coupler are coupled to the downstream coupler and transmitted towards a next radio communications node in the series interconnection, and radio carrier signals received via the downstream coupler are coupled to the upstream coupler and transmitted by the upstream coupler towards the central processing unit, and wherein the control circuitry is configured to output control signaling that indicates timing for Time Division Duplexing (TDD) operation of the radio communications node, such that, in base-station operation, the radio communications node either receives or transmits via the antenna circuitry and the associated antenna array, and such that, in relay operation, the radio communications node either relays radio signals towards the central processing unit or relays radio signals away from the central processing unit.

13. A radio communication system comprising:
respective first and second chains of radio communications nodes (RCNs) that are serially interconnected to a first central processing unit (CPU) via dielectric-waveguide (DWG) links;
respective third and fourth chains of RCNs that are serially interconnected to a second CPU via DWG links;
respective fifth and sixth chains of RCNs hat are serially interconnected to a third CPU via DWG links;
failover elements comprising:
a first failover DWG link coupling a terminal end of the second chain to a terminal end of the third chain, and a second failover DWG link coupling a terminal end of the fourth chain to a terminal end of the fifth chain; and
a first failover CPU coupled to a terminal end of the first chain, and a second failover CPU coupled to a terminal end of the sixth chain; and
a supervisory apparatus configured to selectively activate the first and second failover CPUs and the first and second failover DWG links, to allow the first CPU or the first failover CPU to serve RCNs beyond the first failover DWG link and to allow the third CPU or the second failover CPU to serve RCNs beyond the second failover DWG link.

* * * * *